(12) United States Patent
Tanaka

(10) Patent No.: US 6,835,941 B1
(45) Date of Patent: Dec. 28, 2004

(54) STAGE UNIT AND ITS MAKING METHOD, AND EXPOSURE APPARATUS AND ITS MAKING METHOD

(75) Inventor: Keiichi Tanaka, Funabashi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/856,143

(22) PCT Filed: Nov. 30, 1998

(86) PCT No.: PCT/JP98/05373

§ 371 (c)(1),
(2), (4) Date: May 30, 2001

(87) PCT Pub. No.: WO00/33318

PCT Pub. Date: Jun. 8, 2000

(51) Int. Cl.⁷ .......................... H02K 41/00; H01L 21/00
(52) U.S. Cl. ............... 250/491.1; 250/492.2; 250/398; 310/12; 310/91; 318/566
(58) Field of Search .................... 250/491.1, 492.2, 250/398; 310/12, 91; 318/566

(56) References Cited

U.S. PATENT DOCUMENTS

| | | |
|---|---|---|
| 5,172,160 A | 12/1992 | Van Eijk et al. |
| 6,246,204 B1 * | 6/2001 | Ebihara et al. ............. 318/649 |
| 6,339,266 B1 * | 1/2002 | Tanaka ........................ 310/12 |
| 6,417,914 B1 * | 7/2002 | Li ................................ 355/75 |

FOREIGN PATENT DOCUMENTS

| | | |
|---|---|---|
| JP | 58-175020 | 10/1983 |
| JP | 06-163353 | 6/1994 |
| JP | 10-112433 | 4/1998 |
| JP | 10-125593 | 5/1998 |

* cited by examiner

*Primary Examiner*—Nikita Wells
(74) *Attorney, Agent, or Firm*—Oblon, Spivak, McClelland, Maier & Neustadt, P.C.

(57) ABSTRACT

By applying a force to cancel a reaction acting on a stator due to driving of a mover to the stator by an electromagnetic interaction generated between reaction canceling magnetic pole units and armature coils, and by having a magnetic pole unit, which constitutes the mover, composed by combining magnets having such magnetization-directions that their magnetic flux are toward the stator and magnets having magnetization-directions crossing the aforementioned magnetization-directions without using yoke material for the mover to be light weight, the vibration of the stator can be prevented even upon the high speed drive of the mover. Therefore, a highly precise positioning control can be performed while moving a placed sample at high speed.

31 Claims, 17 Drawing Sheets

(A)

(B)

(C)

(D)

(A)

(B)

(C)

(A)

(B)

(A)

(B)

(A)

(B)

(A)

(B)

(C)

(A)

(B)

(A)

(B)

STAGE UNIT AND ITS MAKING METHOD, AND EXPOSURE APPARATUS AND ITS MAKING METHOD

TECHNICAL FIELD

The present invention relates to a stage unit and its making method, and an exposure apparatus and its making method, and, more specifically, a stage unit which controls the position of a sample placed on itself and its making method, and an exposure apparatus which is equipped with the stage unit and transfers a predetermined pattern onto a wafer, and its making method.

BACKGROUND ART

In a lithography process for making a semiconductor device, liquid crystal display device, or the like, an exposure apparatus has been used. In such an exposure apparatus, patterns formed on a mask or reticle (to be generically referred to as a "reticle" hereinafter) are transferred through a projection optical system onto a substrate such as a wafer or glass plate (to be referred to as a "substrate" or "wafer" hereinafter, as needed) coated with a resist, etc. As apparatuses of this type, a static exposure type projection exposure apparatus, e.g., a so-called stepper, and a scanning exposure type projection exposure apparatus, e.g., a so-called scanning stepper are mainly used. Such an exposure apparatus is equipped with a stage unit, which is movable in two-dimensional directions while holding a wafer, to transfer a pattern formed on a reticle onto a plurality of shot areas on the wafer in turn.

In such a stage unit, the wafer is held on a wafer holder by vacuum chucking, etc. and fixed on a wafer table (movable body) to set the position of the wafer to a exposure position with high accuracy. Such wafer tables have been driven along a mechanical guide surface by a driving unit mechanically in contact with the wafer table and movable. Therefore, stage units have been equipped with X-stage to drive the wafer table in X direction and Y-stage to drive the wafer table together with X-stage in Y direction to move the wafer table on the X-Y plane.

Meanwhile, the development of a stage unit which controls the position of a wafer with high accuracy without being affected by the mechanical accuracy, etc. of a guide surface and performs positioning of the wafer by supporting a flat-plate-like shaped and movable body, on which the wafer is placed above a supporting member, by levitation and driving the movable body in a non-contacting manner to avoid mechanical friction and prolong the life of the stage is in progress. As such stage units, a variable magnetic reluctance driving method in which a linear pulse motor, as in a Sawyer motor, using the variable magnetic reluctance driving method is so structured that two axes are combined with each other, and a stage unit using a planar motor as a driving unit (driver) employing a Lorentz (electromagnetic) force method disclosed in, for example, Japanese Patent Laid-Open No. 58-175020 and U.S. Pat. No. 5,196,745 have been suggested.

Recently, wafers on which patterns are transferred by an exposure apparatus are being enlarged. Along with the enlargement of wafers, a wafer table as a table on which a wafer is placed is also enlarged and necessarily the weight of the wafer table is increased. Therefore it is necessary to drive the wafer table by a large force to move the wafer at high speed for the improvement of the through-put of the exposure apparatus.

Incidentally on driving the wafer table, the wafer table and a mover are moved together as one entity against a stator using a driving unit comprising the mover and the stator and on this occasion, a reaction to the force applied to the mover is induced in the stator. As a consequence, a vibration occurs and is transmitted to other members when the mover is mechanically connected with other members of the exposure apparatus, and then inflicts a bad effect on exposure accuracy. For example, when the mover is mechanically connected with a supporting member with respect to a projection optical system of the exposure apparatus, the projection optical system will vibrate and cause the degradation of the exposure accuracy.

Such a bad effect to the exposure accuracy generally becomes severer along with the increase of drive force of the mover. Therefore along with the enlargement of wafers, the mover is driven by a large force to move the wafer at high speed for the improvement of the through-put and the exposure accuracy will be degraded remarkably. That is, along with the enlargement of wafers it is getting difficult to improve both the through-put and the exposure accuracy.

The present invention has been made in view of the condition above. A first object of the present invention is to provide a stage unit that can move a placed sample at high speed and perform accurate positioning.

Also, a second object of the present invention is to provide an exposure apparatus that can improve both the through-put and the exposure accuracy by high speed movement of a substrate and highly accurate positioning.

DISCLOSURE OF INVENTION

From a first aspect, the present invention is a stage unit that is equipped with a driving unit including a mover and a stator; and a reaction canceling mechanism to apply to the stator a force canceling a reaction acting on the stator by electromagnetic interaction. This stage unit is referred to as a "first stage unit of the present invention" hereafter.

According to the present invention, the reaction canceling mechanism generates a force to cancel the reaction acting on the stator by using electromagnetic interaction excellent in controllability and linearity and applies it to the stator, thereby accurately canceling the reaction acting on the stator. Accordingly, even with the increase of the drive force of the mover, the vibration of the stator is prevented and the stage unit is capable of high accurate positioning while moving a sample placed on itself.

In the first stage unit of the present invention, if the reaction canceling mechanism can apply to any arbitrary point of the stator a force having an arbitrary magnitude and an arbitrary direction, the reaction canceling mechanism may generate one kind of force and apply it to an appropriate point (for example, applying a force having the same magnitude as the reaction and opposite direction to the point of reaction application of the stator) to cancel a reaction caused by driving the mover translationally. However, when the stator is rotationally driven or the point of the stator to which the reaction canceling mechanism applies the force is fixed, it is generally impossible to cancel the reaction just by giving the stator one kind of force.

Therefore, in the first stage unit of the present invention, it is preferred for the reaction canceling mechanism to generate a force to act on at least two points of the stator and cancel the reaction as a whole. In this case, if the reaction canceling mechanism can apply forces having an arbitrary magnitude and an arbitrary direction to at least two fixed points of the stator, the reaction acting on the stator by a translational driving, a rotational driving or the combination of the both can be canceled. Especially, when the reaction acting on the stator is a force along a predetermined plane, the reaction can be canceled by applying two kinds of forces being along the predetermined plane and having magnitude and direction corresponding to the reaction.

The aforementioned case shows a case where the reaction canceling mechanism can apply the force having an arbitrary magnitude and an arbitrary direction to the stator. However, in a case where the points of the stator to which the reaction canceling mechanism applies the forces are fixed and the direction of the force applied to each point is predetermined, the reaction generally can not be canceled just by applying two kinds of forces to the stator. In such a case, the reaction canceling mechanism generates forces having respective predetermined directions, which cancel the reaction as a whole, and applies them to at least three points of the stator, thereby being able to cancel the reaction acting on the stator by a translational driving, a rotational driving or the combination of the both. Especially, if the reaction acting on the stator is a force along a predetermined plane, the reaction can be canceled by the reaction canceling mechanism applying three kinds of forces having magnitudes corresponding to the reaction and predetermined directions not parallel to each other, which are applied on three fixed points of the stator and are along the predetermined plane.

In the first stage unit of the present invention, the driving unit can be so structured that the drive force of the mover is generated by electromagnetic interaction. In such a case, as described above, the reaction acting on the stator on driving the mover can be accurately identified before driving the mover by generating the drive force for the mover by using electromagnetic interaction excellent in controllability and linearity. Therefore, the reaction acting on the stator can be canceled with high response-speed and accuracy by the reaction canceling mechanism applying a force to cancel the reaction acting on the stator to the stator in a manner like feed-forward simultaneously with driving the mover. That is, the stator appears to be free from the reaction.

The driving unit which generates the drive force for the mover by electromagnetic interaction is so structured that, for example, the stator has an armature unit including a plurality of armature coils, which are arranged in the shape of a matrix in a predetermined plane and have current paths almost parallel to the predetermined plane, and the mover has a driving magnetic pole unit to generate a magnetic flux having a direction crossing the predetermined plane.

In the first stage unit of the present invention equipped with this driving unit, the reaction canceling mechanism is so structured that reaction canceling magnetic pole units to generate a magnetic flux having a direction crossing the current paths of armature coils disposed on four corners of the armature unit and a control system that controls the direction and amplitude of currents supplied for the armature coils disposed on four corners of the armature unit are equipped. In this case, by the control system controlling the direction and amplitude of currents supplied for the armature coils disposed on four corners of the armature unit and the electromagnetic interaction between magnetic field induced by the magnetic pole units and the currents flowing in the armature coils disposed on four corners of the armature unit, the force canceling the reaction is applied to the stator along the same predetermined plane as the plane that the reaction is along. Accordingly, four forces along a predetermined plane, which have respective predetermined directions in the four fixed points of the stator and have magnitudes corresponding to the reaction, are applied with good controllability and the reaction can be canceled very accurately.

Incidentally, when applying to the stator the force to cancel the reaction acting on the stator on driving the mover, the reaction eventually comes to act on the reaction canceling magnetic pole units. It is preferred that the reaction canceling magnetic pole units and the stator are mechanically independent from each other to prevent the vibration from transmitting to the stator by the reaction acting on the reaction canceling magnetic pole units.

The reaction canceling magnetic pole units can be structured so that forces perpendicular to each other in neighboring corners of the armature unit are generated. In such a case, the force to cancel the reaction acting on the stator can be easily calculated.

From a second aspect, the present invention is a method of making a stage unit comprising a process to provide a driving unit including the mover and the stator; and a process to provide the reaction canceling mechanism to apply the force canceling the reaction, which is induced by the driving of the mover and is acting on the stator, to the stator by the electromagnetic interaction. According to this, by providing the driving unit and the reaction canceling mechanism and combining these and other elements mechanically, electrically, and optically as the need arises, the first stage unit of the present invention is made.

From a third aspect, the present invention comprises the armature unit including a plurality of armature coils, which are arranged in the shape of a matrix on the predetermined plane and whose current paths are almost parallel to the predetermined plane; the magnetic pole unit having a plurality of magnets magnetized in directions not perpendicular to the predetermined plane and two-dimensionally generating an alternating magnetic field with a period of 4P/3 in two axis-directions perpendicular to each other practically without generating any magnetic field in an area opposite to the armature unit; and a current driving unit to move the magnetic pole unit relatively to the armature unit in a plane parallel to the predetermined plane by supplying currents to the armature coils respectively. Hereinafter, this stage unit is referred to as a "second stage unit of the present invention".

According to this, in making a steady magnetic circuit having a low magnetic resistance, the magnetic pole unit is composed only of the aforementioned magnets without using other magnetic members than the magnets, thereby realizing the light weight of the mover. Accordingly, the driving force of the mover can be reduced and the reaction acting on the stator can be reduced, thereby the vibration of the stator can be decreased and highly accurate positioning can be realized while moving a placed sample at a high speed.

The second stage unit of the present invention can further comprise a magnetic member supporting the armature coils in a side opposite to the magnetic pole unit. In such a case, a magnetic circuit is structured through the magnetic pole unit and the magnetic member, thereby a steady magnetic circuit having a low magnetic resistance can be structured. Therefore, a magnetic flux having high flux density can be generated in the positions of the armature coils. Incidentally, as a material for the magnetic member, one having high electric resistance, high saturation magnetic flux density, low magnetic hysteresis, and low coercive force is preferred.

Also, the second stage unit of the present invention can further comprise a flat-plate-like shaped member disposed between the armature unit and the magnetic pole unit and made of a non-magnetic and non-conductive material. In such a case, when structuring the magnetic pole unit so that it is not contacting the armature unit by an air-bearing system, an air blown out of the magnetic pole unit is blown on the flat-plate-like shaped member, thereby the magnetic pole unit and the flat-plate-like shaped member, eventually the armature unit can be non-contacting each other. Furthermore, because the flat-plate-like shaped is non-magnetic and non-conductive, the magnetic flux generated by the magnetic pole unit is not affected. Accordingly, an easy implementation of relative movement at high speed by a small driving force is possible. Incidentally, a non-magnetic material means a material having magnetic permeability small enough compared with a magnetic material such as iron, etc. and almost equal to that of the air. Furthermore, a non-conductive material means a material having conductance small enough compared with a conductive material such as copper, etc. and almost equal to that of the air.

Furthermore, the second stage unit of the present invention can be so structured that the current driving unit supplies currents for the respective armature coils independently. In such a case, the value and direction of each of currents supplied for the respective armature coils can be controlled independently, thereby the magnetic pole unit and the armature unit can be relatively moved in a predetermined direction.

Furthermore, the second stage unit of the present invention comprises a position detection system to detect the positional relation between the magnetic pole unit and the armature unit; and a control unit (controller) to control at least one of the value and direction of each of currents supplied for the respective armature coils via the current driving unit based on detection results by a position detection. In such a case, the relative position and the relative speed between the magnetic pole unit and the armature unit can be controlled by controlling the value and direction of the respective currents flowing in the armature coils based on position information (speed information) obtained by the position detection system with respect to the magnetic pole unit and the armature unit.

The second stage unit comprising the position detection system and the control unit described above is so structured that the control unit selectively supplies currents for the armature coils opposite with the magnetic pole unit. In such a case, with not supplying currents for armature coils in which no or just weak Lorentz force is induced, efficient current supply is possible and current dissipation can be reduced while maintaining the driving force.

From a fourth aspect, the present invention is a making method comprising a process to provide the armature unit including a plurality of armature coils having a current path almost parallel to the predetermined plane and being arranged in the shape of a matrix on the predetermined plane; a process providing the magnetic pole unit having a plurality of magnets magnetized in directions not perpendicular to the predetermined plane and two-dimensionally generating an alternating magnetic field with a period of 4P/3 in two axis-directions perpendicular to each other practically without generating any magnetic field in an area opposite to the armature unit; and a process providing a current driving unit to move the magnetic pole unit relatively to the armature unit in a plane parallel to the predetermined plane by supplying currents for the armature coils respectively. According to this, by providing the armature unit, the magnetic pole unit and the driving unit, and then combining and adjusting these and other elements mechanically, electrically, and optically as the need arises, the second stage unit of the present invention is made.

In this case, furthermore, it is possible to include a process to provide the position detection system to detect a positional relation between the magnetic pole unit and the armature unit; and a process to provide the control unit to control at least one of the value and direction of each of currents supplied for the respective armature coils through the current driving unit based on detection results by a position detection. In such a case, a stage unit, in which the relative position and the relative speed between the magnetic pole unit and the armature unit can be controlled, can be made.

Incidentally, needless to say, both the first stage unit and the second stage unit can be applied to one stage unit. In such a case, the reaction can be accurately canceled as well as reducing the reaction acting on the stator by, for example, decreasing the driving force of the magnetic pole unit as a mover.

Furthermore, by applying both the making method of the first stage unit and that of the second stage unit to the making of one stage unit, a stage unit to which both the first stage unit and the second stage unit are applied can be made.

From a fifth aspect, out of exposure apparatuses that expose the substrate by irradiating an energy beam and transfer a predetermined pattern onto the substrate, the present invention is an exposure apparatus having a feature of comprising a stage unit as a position control unit to control the position of the substrate.

According to this, by exposing the substrate placed on the stage unit of the present invention, a move at a high speed and highly accurate control of position of the substrate are possible, and both the through-put and the accuracy of exposure can be improved.

From a sixth aspect, out of making methods of an exposure apparatus that exposes a substrate by irradiating an energy beam and transfers an predetermined pattern onto the substrate, the present invention is a method of making the stage unit by providing the driving unit including the mover and the stator, and the reaction canceling mechanism to apply the force canceling the reaction, which is induced by the driving of the mover and is acting on the stator, to the stator by the electromagnetic interaction; and an exposure apparatus making method including the disposing of the stage unit as a position control apparatus to control the position of the substrate. According to this, an exposure unit comprising the first stage unit of the present invention as a position control apparatus to control the position of the substrate is made.

From a seventh aspect, out of making methods of an exposure apparatus that exposes a substrate by irradiating an energy beam and transfers an predetermined pattern onto the substrate, the present invention is a method of making the stage unit by providing the armature unit including a plurality of armature coils that are arranged in the shape of a matrix on the predetermined plane and have current paths almost parallel to the predetermined plane, the magnetic pole unit having a plurality of magnets magnetized in directions not perpendicular to the predetermined plane and two-dimensionally generating an alternating magnetic field with a period of 4P/3 in two axis-directions perpendicular to each other, between the armature coils and itself, practically without generating any magnetic field in an area opposite to the armature unit, and the current driving unit to move the magnetic pole unit relatively to the armature unit in a plane parallel to the predetermined plane by supplying currents for the armature coils respectively; and an exposure apparatus making method including the disposing of the stage unit as a position control apparatus to control the position of the substrate. According to this, an exposure unit comprising the second stage unit of the present invention as a position control apparatus to control the position of the substrate is made.

Incidentally, needless to say, an exposure apparatus can be structured which comprises a stage unit, to which both the first stage unit and the second stage unit of the present invention are applied, as a position control apparatus to control the position of the substrate. In such a case, both the through-put and the accuracy of exposure can be improved.

Furthermore, by applying both the making method of an exposure apparatus comprising the first stage unit and the making method of an exposure apparatus comprising the second stage unit of the present invention to the making of one exposure apparatus, an exposure apparatus can be made which comprises a stage unit to which both the first stage unit and the second stage unit of the present invention are applied.

BEST MODE FOR CARRYING OUT THE INVENTION

Figure 1:
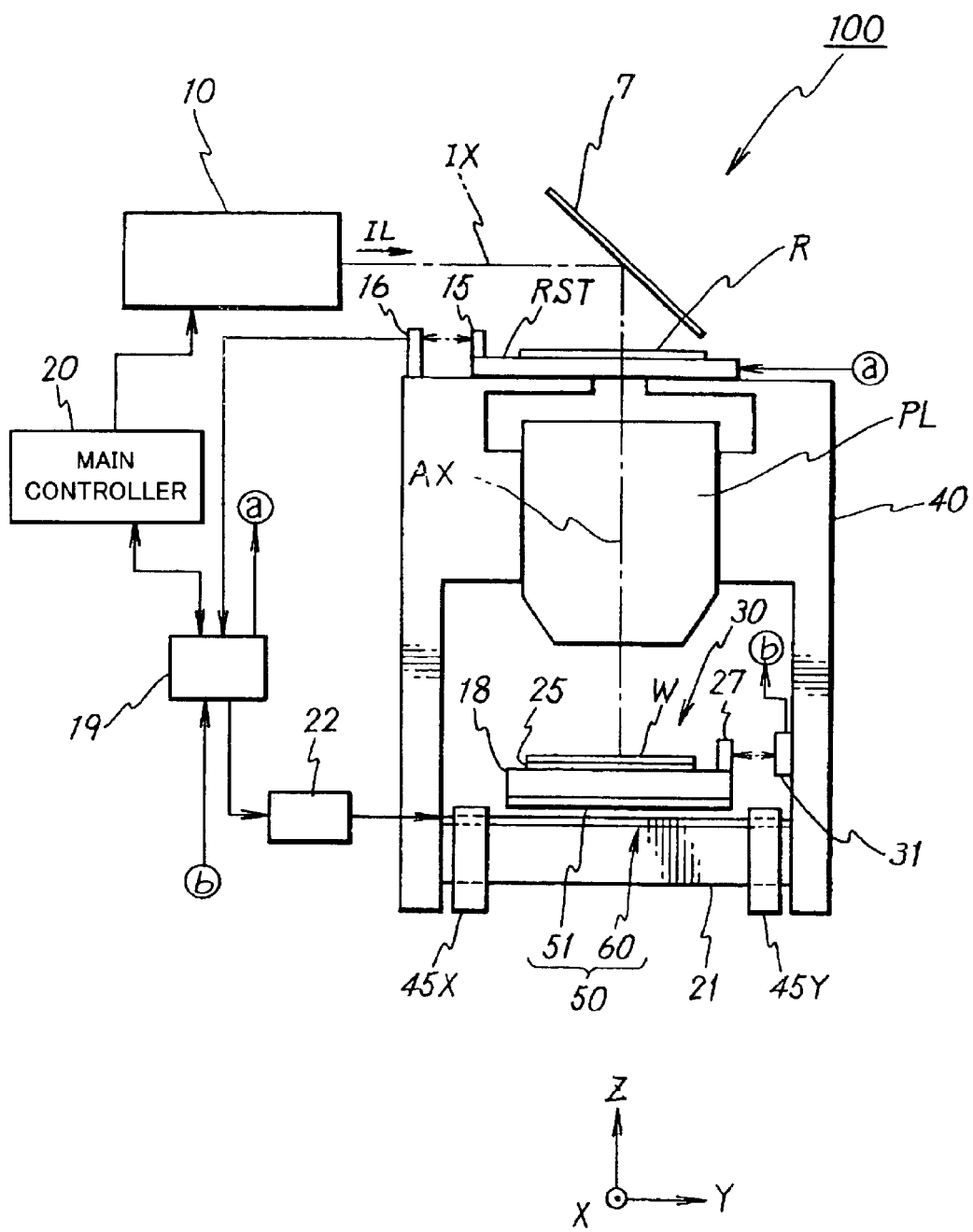
FIG. 1 is a diagram showing the schematic arrangement of an exposure apparatus according to an embodiment of the present invention.

An embodiment of the present invention will be described below with reference to FIG. 1 to FIG. 16. FIG. 1 shows the entire configuration of an exposure apparatus. 100 according to the embodiment of the present invention. Incidentally, this exposure apparatus 100 is an exposure apparatus based on the so-called step and scan exposure method.

The exposure apparatus 100 comprises: an illumination system 10; a reticle stage RST holding a reticle R as a mask; a projection optical system PL; a stage unit 30 to drive a wafer W as a substrate in X-Y two-dimensional directions on an X-Y plane (including rotational moves around Z axis ; and a control system for controlling these elements.

The illumination system 10 is comprised of a light source, an illuminance uniformization optical system constituted by a fly-eye lens and the like, a relay lens, a variable ND filter, a reticle blind, a dichroic mirror, and the like (none of which are shown). The arrangement of such an illumination system is disclosed in, for example, Japanese Patent Laid-Open No. 10-112433. This illumination system 10 illuminates a slit-like (in the shape of rectangle or circular arc) illumination area portion IRA (refer to FIG. 10) defined by the reticle blind above the reticle R, on which a circuit pattern and the like are drawn, with illumination light IL and with almost uniform illuminance.

The reticle R is fixed on the reticle stage RST by, for example, vacuum chucking. In order to position the reticle R, the reticle stage RST can be finely driven within the X-Y plane perpendicular to the optical axis of the illumination system 10 (which coincides with an optical axis AX of the projection optical system PL (to be described later)) by a reticle stage driving unit (not shown) formed by a magnetic levitation type two-dimensional linear actuator, and can also be driven in a predetermined scanning direction (the Y direction in this case) at a designated scanning velocity. In this embodiment, the above magnetic levitation type two-dimensional linear actuator includes a Z drive coil in addition to X and Y drive coils, and hence can finely drive the reticle stage RST in the Z direction as well.

The stator of the two-dimensional linear actuator described above is supported by a reaction frame (not shown) disposed independently from a supporting member 40. Therefore, the reaction acting on the stator of the two-dimensional linear actuator is transmitted through the reaction frame to the ground (floor) but not to the supporting member 40 on driving the reticle stage RST. Such transmission through a reaction frame to the ground is disclosed in, for example, the U.S. patent application Ser. No. 08/416, 558. The disclosure in the United States Patent Application described above is fully incorporated by reference herein as long as the national laws in designated states or elected states, to which this international application is applied, permit.

The position of the reticle stage RST within a stage moving plane is detected all the time through a movable mirror 15 by a reticle interferometer 16 fixed on the supporting member 40 as a position detection unit with a resolution of, for example, 0.5 to 1 nm. Positional information of the reticle stage RST from the reticle interferometer 16 is sent to a stage control system 19 and the stage control system 19 drives the reticle stage RST via a reticle stage driving portion (not shown) based on the positional information of the reticle stage RST. Incidentally, in practice, a movable mirror having a reflection surface perpendicular to the scanning direction (Y axis direction) and a movable mirror having a reflection surface perpendicular to the non-scanning direction (X axis direction) are attached on the reticle stage RST and the reticle interferometer 16 has one axis in the scanning direction and two axes in non-scanning direction. In FIG. 1; however, the movable mirror 15 and the reticle interferometer 16 are representatively shown.

The projection optical system PL is arranged under the reticle stage ST as shown in FIG. 1, and the optical axis AX (coinciding with the optical axis IX of the illumination optical system) is set as the Z-axis direction. In this embodiment, a refraction optical system is employed which is structured of a plurality of lenses disposed along the optical axis AX at a predetermined interval, so as to make a double telecentric optical arrangement. The projection optical system PL is a reduction optical system having a predetermined magnification of, for example, ⅕ (or ¼). Therefore, when the illuminating light emitted by the illumination system 10 illuminates the illumination area IAR of the reticle R, a reduced image (a partially inverted image) of a circuit pattern of the reticle R is formed on an exposure area IA on a wafer W, which is conjugate with the illumination area IRA (refer to FIG. 10). The image is formed on the wafer W, which has a photoresist coated on its surface, through the projection optical system PL by the illumination light that passes through the reticle R.

The stage unit 30 comprises: a base 21; a substrate table 18 supported by air levitation with an air slider (to be described later) above the upper surface of this base 21 via a clearance of several microns or so; and a driving unit 50 for driving the substrate table 18 within the X-Y plane in two-dimensional directions.

A wafer holder 25 is fixed on the substrate table 18 and a wafer W is held by the wafer holder 25 using, for example, vacuum chucking.

Figure 2:
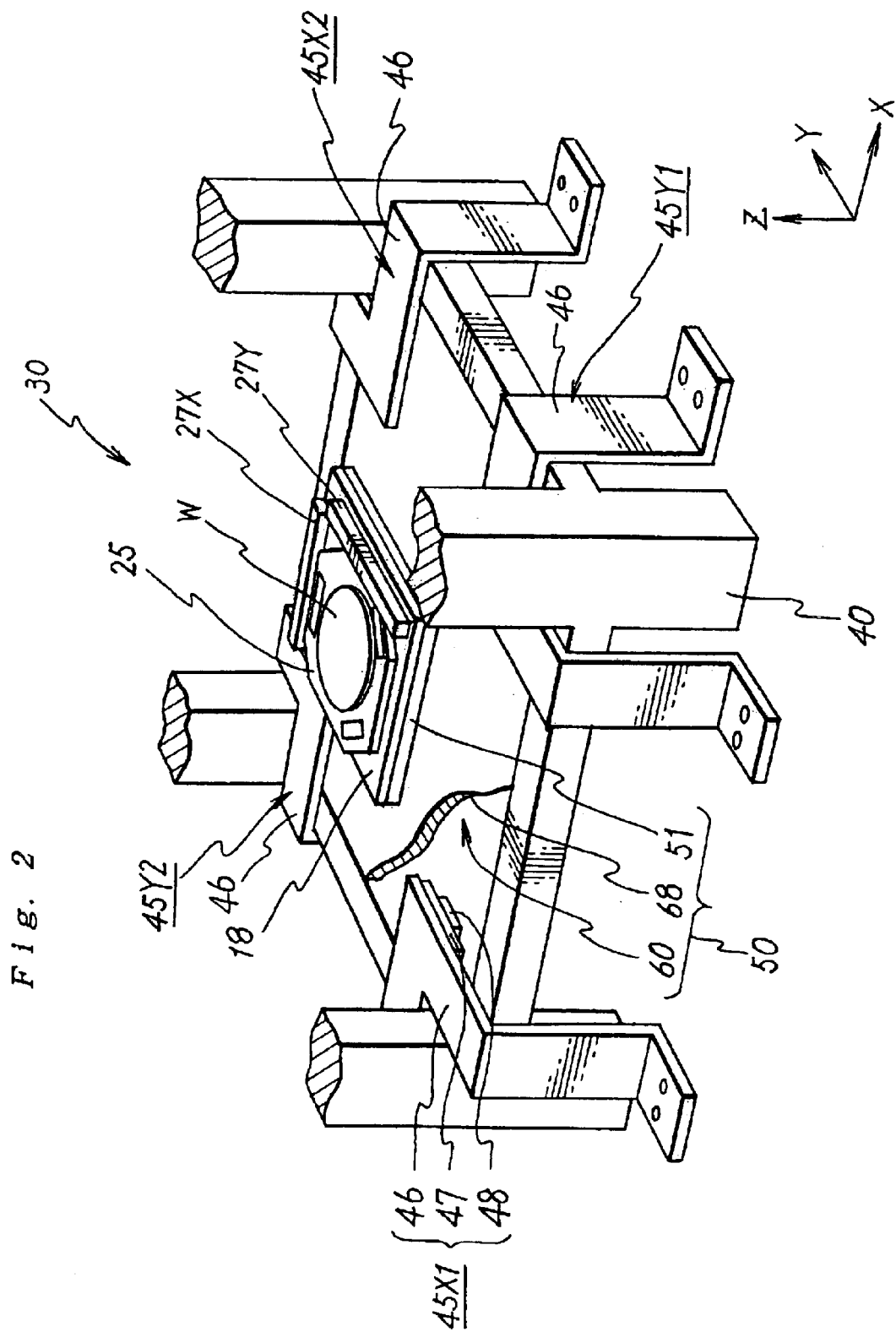
FIG. 2 is a perspective diagram showing an arrangement around the stage unit of the exposure apparatus of FIG. 1.

Furthermore, a movable mirror 27 to reflect a laser beam from a wafer laser interferometer (referred to as "wafer interferometer" hereafter) 31, which is fixed on the supporting member 40 as a position detection unit, is fixed on the substrate table 18. The position of the wafer W in X-Y plane is detected all the time by the externally placed wafer-interferometer 31 with a resolution of 0.5 to 1 nm or so. As shown in FIG. 1, the wafer-interferometer 31 is attached on the supporting member 40. Positional information (or speed information) of the wafer is sent to the stage control system 19 and then to the main control unit 20, and the stage control system 19 controls the driving unit 50 via the current driving unit 22 in accordance with instructions from the main control unit 20 and based on the Positional information (or speed information). Incidentally, in practice as shown in FIG. 2, a movable mirror 27Y having a reflection surface perpendicular to the scanning direction (Y axis direction) and a movable mirror 27X having a reflection surface perpendicular to the non-scanning direction (X axis direction) are attached on the substrate table 18 and the wafer interferometer 31 has one axis in the scanning direction and two axes in the non-scanning direction. In FIG. 1, however, the movable mirror 27 and the wafer interferometer 31 are representatively shown.

The reticle stage RST (excluding the not shown stator) described above, the projection optical system, the base 21, the reticle interferometer 16, and the wafer interferometer 31 are held by the supporting member 40 and mechanically combined.

Furthermore, the exposure apparatus of the present embodiment 100 comprises reaction canceling magnetic pole units 45X, 45Y to generate a magnetic field for applying a force canceling a reaction acting on the stator 60 of the driving unit 50 to the stator 60. Incidentally, the reaction canceling magnetic pole unit 45X generates a magnetic field to cancel X-component of the reaction acting on the stator 60 and the reaction canceling magnetic pole unit 45Y generates a magnetic field to cancel Y-component of the reaction acting on the stator 60. The structure of the reaction canceling magnetic pole units 45X, 45Y will be described later. Incidentally, in practice, as shown in FIG. 2, the reaction canceling magnetic pole units 45X1, 45X2 are disposed in the respective corners of two corners in a first diagonal relation out of the four corners of the stator. In FIG. 1, however, just the reaction canceling magnetic pole units 45X is illustrated representing these. And the reaction canceling magnetic pole units 45Y1, 45Y2 are disposed in the respective corners of two corners in a second diagonal relation out of the four corners of the stator. In FIG. 1, however, just the reaction canceling magnetic pole units 45Y is illustrated representing these.

On the substrate table 18, a fiducial mark plate (not shown) is fixed on which various kinds of fiducial marks for the measurement of base lines to measure the distance between the detection center of an alignment-detection system (not shown) of the off-axis method and the optical axis of the projection optical system PL are formed.

Furthermore, the exposure apparatus 100, shown in FIG. 1, comprises a multiple focal position detection system which is one of focus detecting systems (or focal point detecting systems) based on the oblique incidence method. The system is for detecting the position in Z direction (the direction of optical axis AX) of the area including the exposure area IA on the wafer W's surface and the neighborhood. This multiple focal position detection system comprises an illumination optical system (not shown) and a light receiving system (not shown). The detailed configuration of the multiple focal position detection system is disclosed in, for example, Japanese Patent Laid-Open No. 6-283403 and its corresponding U.S. Pat. No. 5,448,332. The disclosure of this multiple focal position detection system in the United States Patent described above is fully incorporated by reference herein as long as the national laws in designated states or elected states, to which this international application is applied, permit.

As the driving unit 50, a planar motor-composed of the stator 60 embedded in the upper portion of the base 21 and a mover 51 fixed to the bottom portion (the surface side opposite with the base) of the substrate table 18, is used. In the following description, the driving unit 50 will be referred to as the planar motor 50 for the sake of convenience. The detailed description of the structure of this planar motor 50 and the structure of the reaction canceling mechanism to cancel the reaction acting on the stator will follow.

Figure 3:
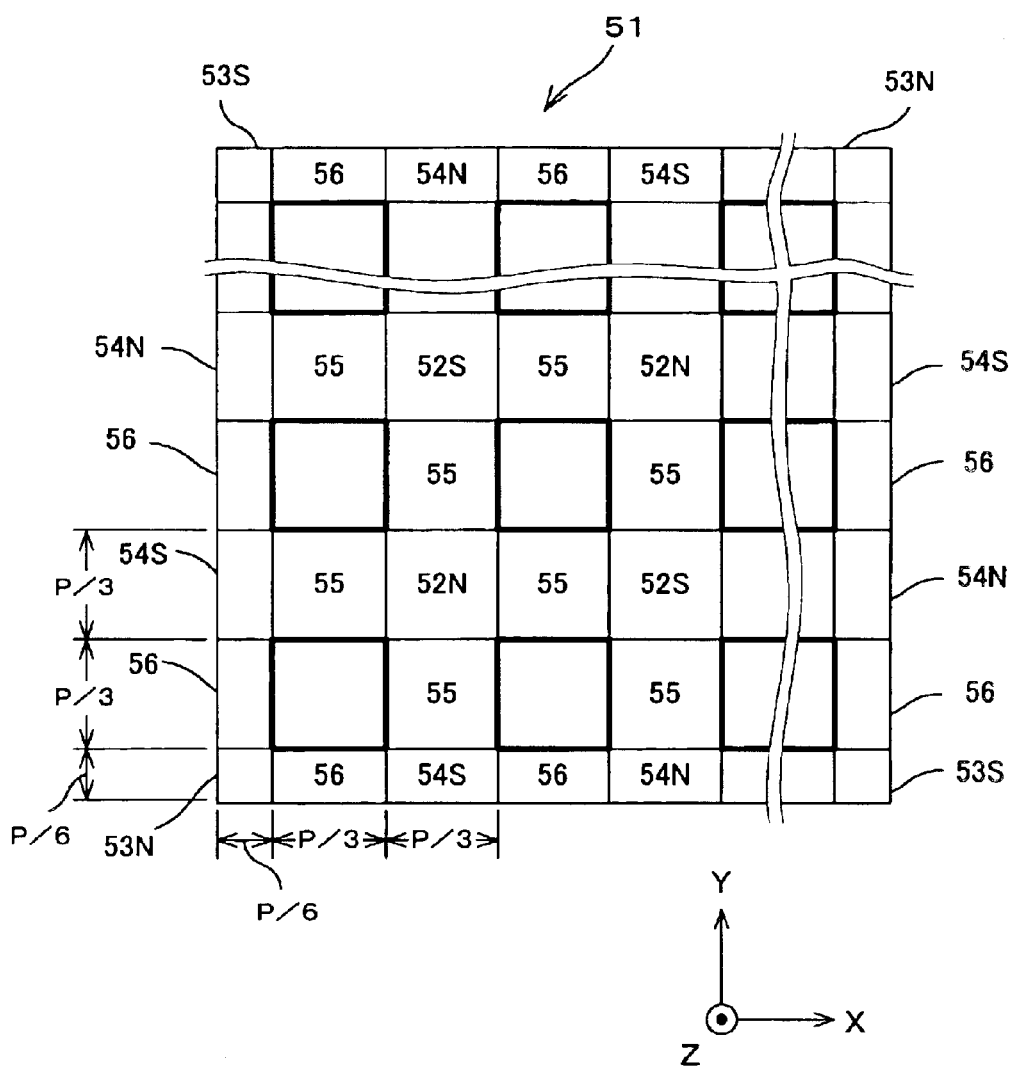
FIG. 3 is a diagram showing the arrangement of the magnetic pole unit.
Figure 4:
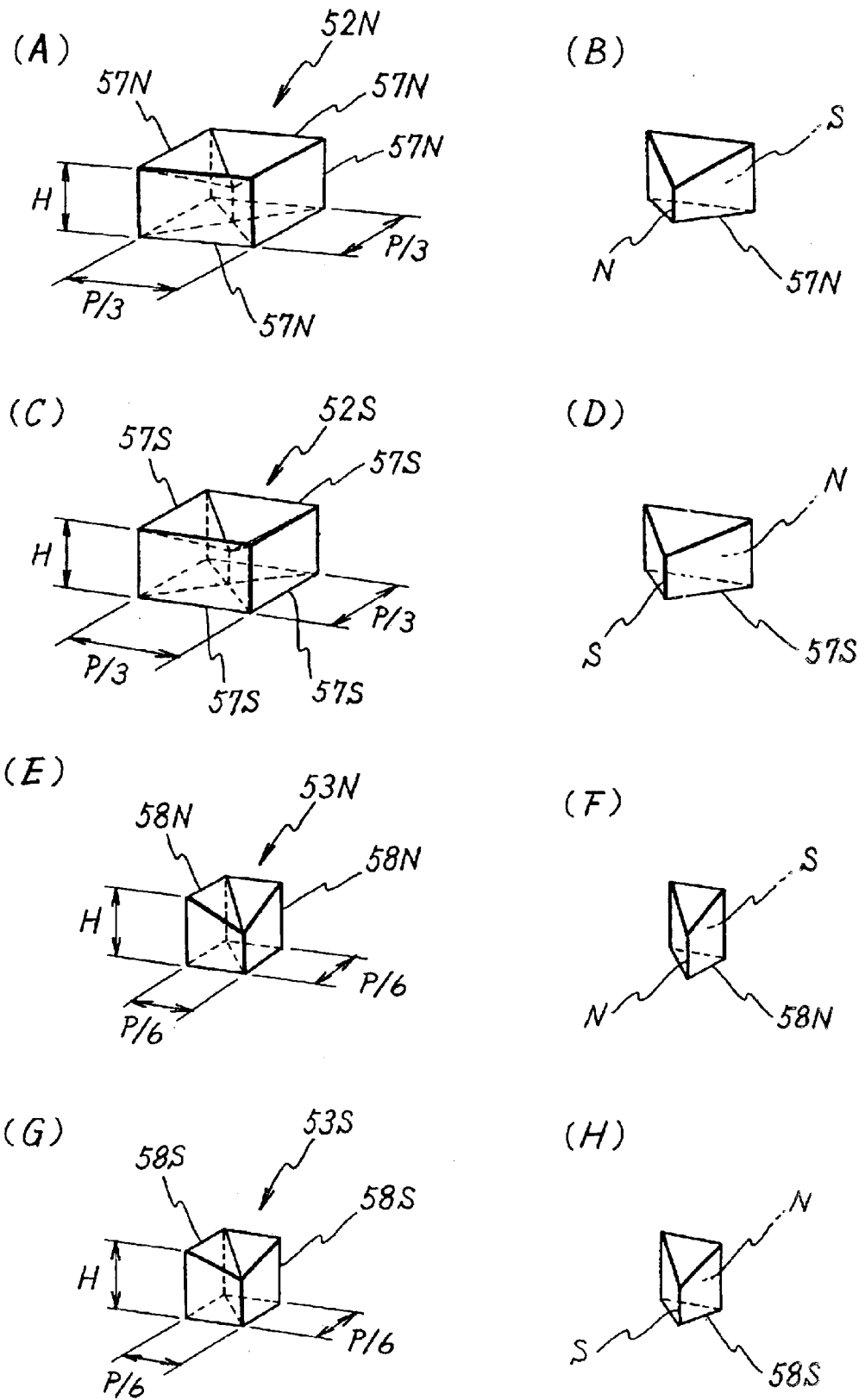
FIGS. 4(A) to 4(H) are diagrams (No.1) showing the arrangements of permanent magnet modules composing the magnetic pole unit and the shapes of permanent magnets.
Figure 5:
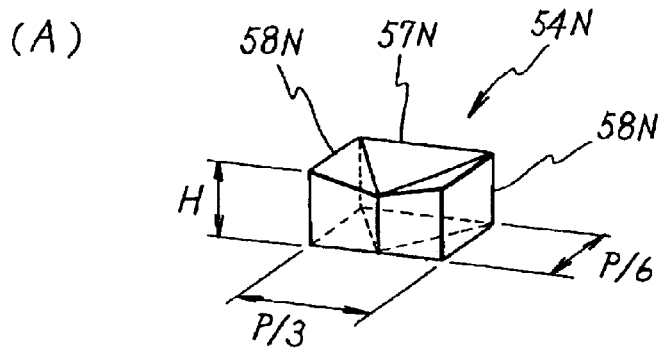
FIGS. 5(A) to 5(D) are diagrams (No.2) showing the arrangements of permanent magnet modules composing the magnetic pole unit and the shapes of permanent magnets.
Figure 5:
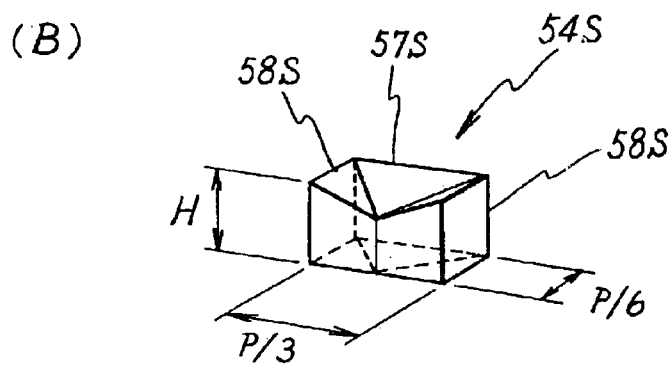
Figure 5:
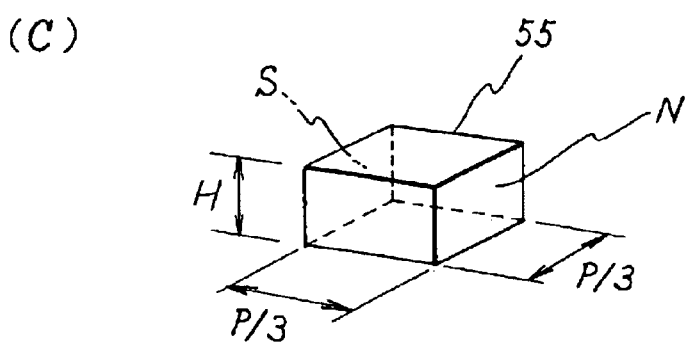
Figure 5:
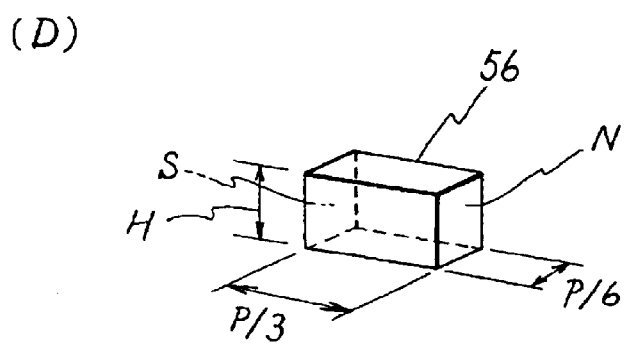

The mover 51 is, in the present embodiment, so structured that permanent magnet modules (52N, 52S, 53N, 53S, 54N, 54S) and permanent magnets 55, 56, as shown in FIG. 3, are arranged in a shape of mesh as a whole in a planar view. In the following description, this mover is also referred to as a driving magnetic pole unit 51 for the sake of convenience. Furthermore, the permanent magnet modules 52N, 53N, 54N are magnets having the surface opposite with the stator 60 practically magnetized as N pole, and the permanent magnet modules 52S, 53S, 54S are magnets having the surface opposite to the stator 60 practically magnetized as S pole. Incidentally, in FIG. 3, hollow portions are surrounded by thick lines and to show the numbers of the components except for the left end and the right end of the mesh-like structure, those numbers are written on the respective components omitting leader lines.

In the driving magnetic pole unit 51, the permanent magnet modules 52N, 52S are arranged alternately in the shape of a matrix in the center of the mesh-like structure described above. Furthermore, the permanent magnet modules 53N, 53S are arranged alternately on the four corners of the mesh-like structure and the permanent magnet modules 54N, 54S are arranged alternately on each end, and between the permanent magnet module 52N and the permanent magnet module 52S, between the permanent magnet module 52N and the permanent magnet module 54S, and between the permanent magnet module 52S and the permanent magnet module 54N, a permanent magnet 55 is placed respectively, and between the permanent magnet module 53N and the permanent magnet module 54S, between the permanent magnet module 53S and the permanent magnet module 54N, and between the permanent magnet module 54N and the permanent magnet module 54S, a permanent magnet 56 is placed respectively.

Incidentally, as shown in FIG. 3, it is when an odd number of the permanent magnet modules 52N, 52S are placed both in the lateral direction (X axis direction) and longitudinal direction (Y axis direction) that the permanent magnet modules 53N, 53S are alternately arranged on the four corners of the mesh-like structure. When an even number of the permanent magnet modules 52N, 52S are placed in the lateral direction, the permanent magnet modules 53N's or 53S's are placed on the both of the two corners in the lateral direction, and when an even number of the permanent magnet modules 52N, 52S are placed in the longitudinal direction, the permanent magnet modules 53N's or 53S's are placed on the both of the two corners in the longitudinal direction. Accordingly, when an even number of the permanent magnet modules 52N, 52S are placed both in the lateral direction and the longitudinal direction, the permanent magnet modules 53N's or 53S's are placed on the all four corners of the mesh-like structure.

Furthermore, in the present embodiment, the permanent magnet modules 52N, 52S are arranged in the shape of a square matrix.

The permanent magnet module 52N, as shown in FIG. 4(A), has a square bottom surface with P/3 as the length of one side, takes H as the height of the periphery and has such a shape that a concave is formed in the center of the upper surface as a whole. This permanent magnet module 52N comprises four of permanent magnet 57N having the shape of a wedge shown in FIG. 4(B). Such a permanent magnet 57N has a surface becoming the periphery of the permanent magnet module 52N to be S pole and another surface becoming the center of the permanent magnet module 52N to be N pole when assembled.

The permanent magnet module 52S is, as shown in FIG. 4(C), in the same shape as the permanent magnet module 52N. This permanent magnet module 52S comprises four of permanent magnet 57S having the shape of a wedge shown in FIG. 4(D). Such a permanent magnet 57S has a surface becoming the periphery of the permanent magnet module 52S to be N pole and another surface becoming the center of the permanent magnet module 52S to be S pole when assembled.

The permanent magnet module 53N, as shown in FIG. 4(E), has a square bottom surface with P/6 as the length of one side, takes H as the height, and has such a shape that the permanent magnet module 52N is divided into four equal parts by two planes respectively parallel to two side-surfaces of the permanent magnet module 52N, which are perpendicular to each other. This permanent magnet module 53N comprises two of permanent magnet 58N having the shape of a wedge shown in FIG. 4(F). Such a permanent magnet 58N has such a shape that the permanent magnet 57N is divided into two equal parts by a plane perpendicular to its bottom surface and S pole surface.

The permanent magnet module 53S, as shown in FIG. 4(G), has a square bottom surface with P/6 as the length of one side, takes H as the height, and has such a shape that the permanent magnet module 52S is divided into four equal parts by two planes respectively parallel to two side-surfaces of the permanent magnet module 52S. This permanent magnet module 53S comprises two of permanent magnet 58S having the shape of a wedge shown in FIG. 4(H). Such a permanent magnet 58S has such a shape that the permanent magnet 57S is divided into two equal parts by a plane perpendicular to its bottom surface and N pole surface.

The permanent magnet module 54N, as shown in FIG. 5(A), has a rectangular bottom surface with P/3 as the length of its long side and with P/6 as the length of its short side, takes H as the height, and has such a shape that the permanent magnet module 52N is divided into two equal parts by a plane parallel to its side-surface. This permanent magnet module 54N comprises one permanent magnet 57N and two permanent magnets 58N's. Furthermore, the permanent magnet module 54S, as shown in FIG. 5(B), has a rectangular bottom surface with P/3 as the length of its long side and with P/6 as the length of its short side, takes H as the height and has such a shape that the permanent magnet module 52S is divided into two equal parts by a plane parallel to its side-surface. This permanent magnet module 54S comprises one permanent magnet 57S and two permanent magnets 58S's.

The permanent magnet 55, as shown in FIG. 5(C), is in the shape of a rectangular solid having a square bottom surface with P/3 as the length of one side and taking H as the height, and has two side-surfaces as a pair opposite with each other, of which one is N-pole surface and the other is S-pole surface. Furthermore, the permanent magnet 56, as shown in FIG. 5(D), is in the shape of a rectangular solid having a rectangular bottom surface with P/3 as the length of one side and P/6 as the length of the other side and taking H as the height, and has two side-surfaces as a pair opposite, in the long-arm direction, with each other of which one is N-pole surface and the other is S-pole surface.

The magnetic pole unit 51 is so structured that the bottom surfaces of the permanent magnet modules (52N, 52S, 53N, 53S, 54N, 54S) and the permanent magnets 55, 56 are arranged in one plane to form the arrangement shown in FIG. 3 in a planar view. Incidentally, the permanent magnets 55, 56 are so disposed that their magnetic-pole surfaces have polarity opposite from the respective magnetic-pole surfaces of the permanent magnet modules 52N, 52S, 53N, 53S, 54N, 54S, which are opposite with those surfaces.

As described above, the driving magnetic pole unit 51 is structured by combining the permanent magnets magnetized in other directions than Z axis and no yoke material is used. Therefore, the driving magnetic pole unit 51 as a mover is lightweight.

Figure 6:
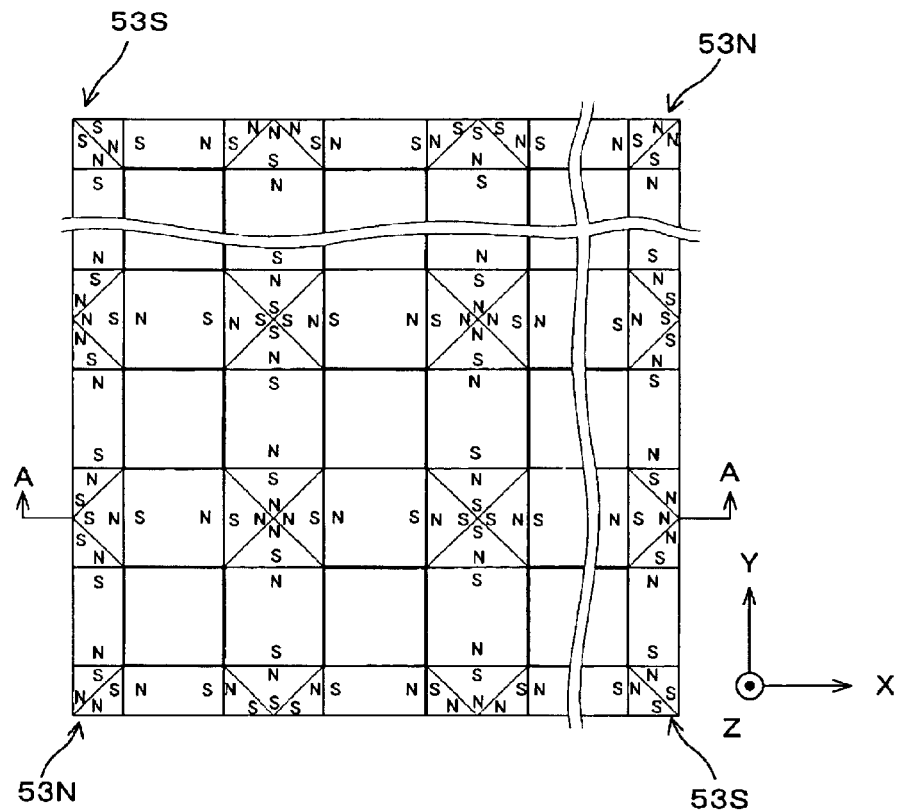
FIGS. 6(A) to 6(C) are diagrams illustrating the arrangement of magnetic poles in the magnetic pole unit.
Figure 6:
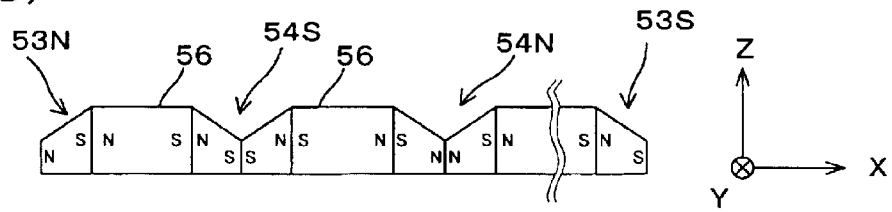
Figure 6:
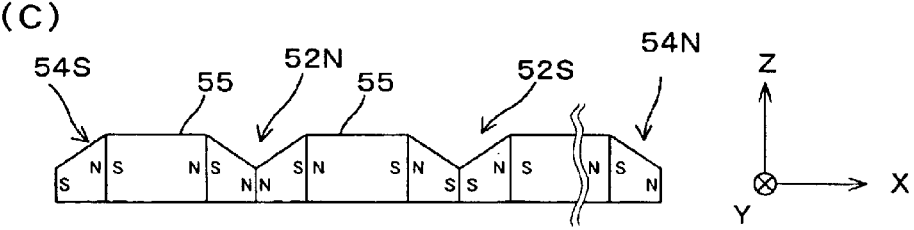

The arrangement of the polarity of the respective permanent magnets in the driving magnetic pole unit 51 composed according to the above description is shown in FIG. 6. FIG. 6(A) shows a planar view of the arrangement of the polarity of the respective permanent magnets in the driving magnetic pole unit 51, FIG. 6(B) shows the arrangement of the polarity of the respective permanent magnets which is seen by looking at the driving magnetic pole unit 51 in FIG. 6(A) from the below, and FIG. 6(C) shows the arrangement of the polarity of the respective permanent magnets in the A—A cross section of FIG. 6(A). Incidentally, FIG. 6(B) and FIG. 6(C) show the arrangement in X-axis direction of the polarity of the respective permanent magnets, meanwhile the same arrangement is true in Y-axis direction as well.

The driving magnetic pole unit 51 has an air slider, not shown, (aero-hydrostatic bearing) fastened on itself, and has the substrate table 18 attached in its upper surface via a supporting mechanism (not shown). In the air slider, a pressured air supplied via a connected air tube from a air pump (not shown) is blew towards the upper surface of the base 21, and the substrate table 18 with the magnetic pole unit 51 is levitated and supported by a static pressure (so-called pressure inside the gap) of the air layer between the upper surface of the base 21 and the driving magnetic pole unit 51.

Figure 7:
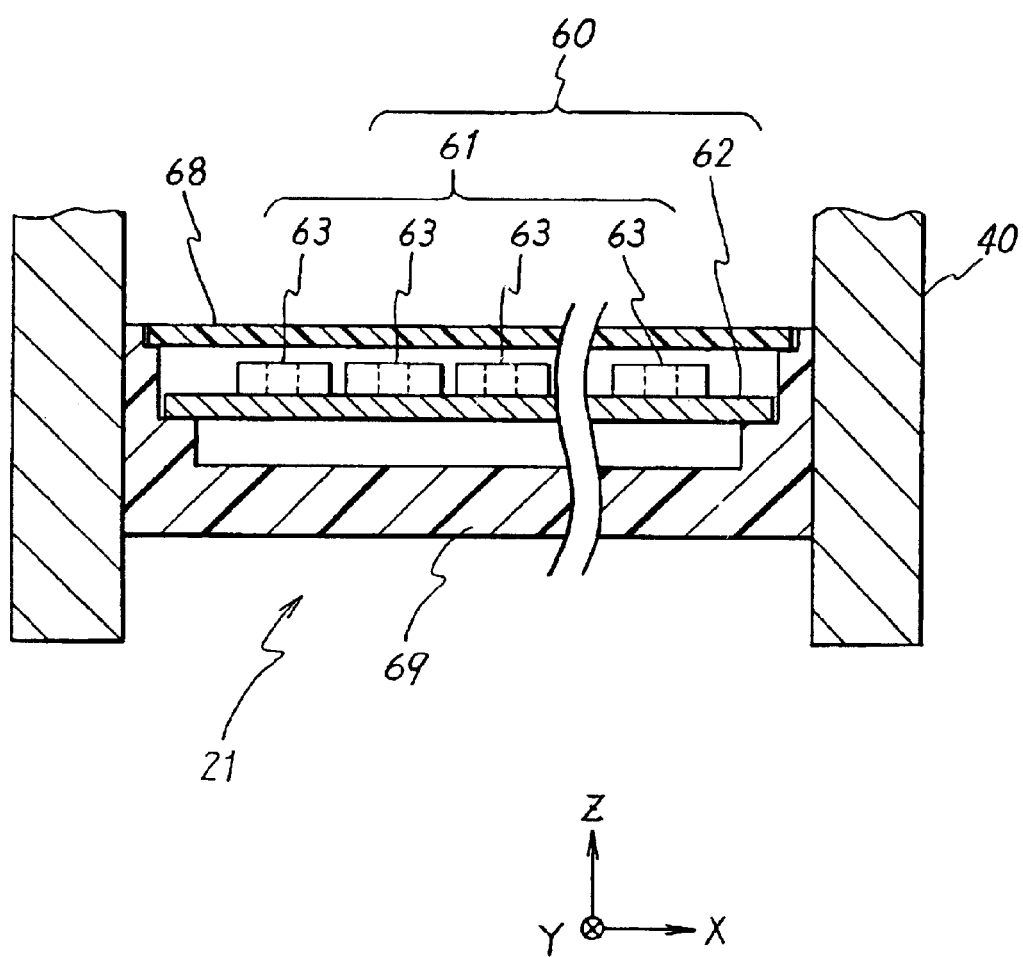
FIG. 7 is a diagram showing an arrangement around the stator.
Figure 8:
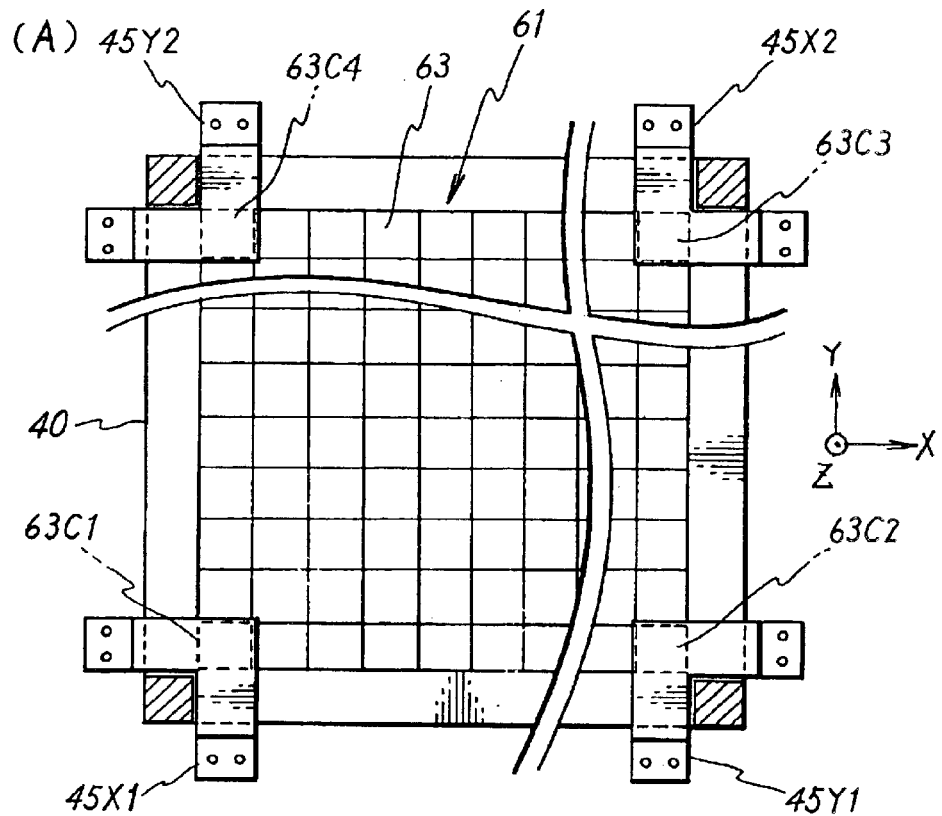
FIGS. 8(A) and 8(B) are diagrams showing the arrangement of a flat-plate-like shaped coil module.
Figure 8:
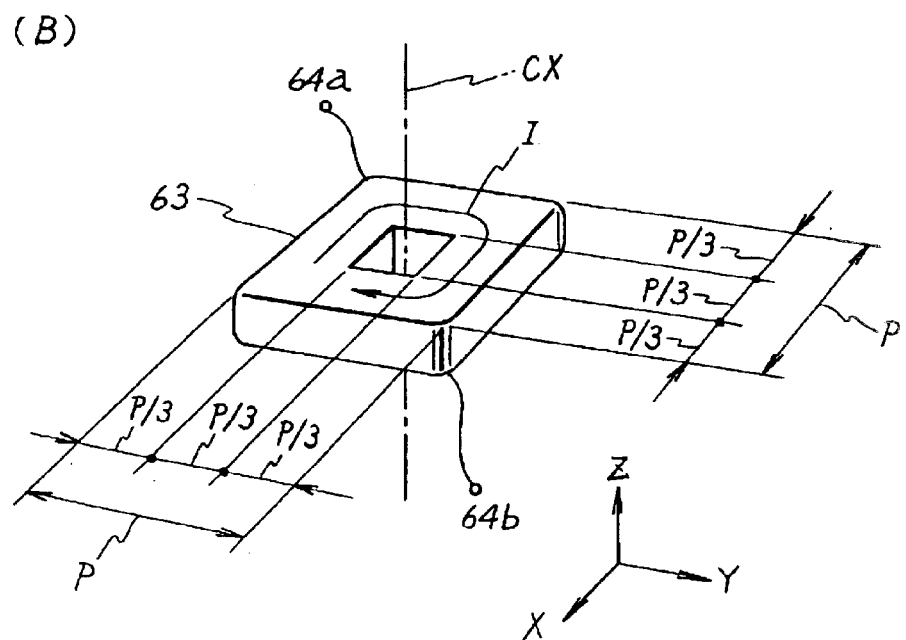
Figure 9:
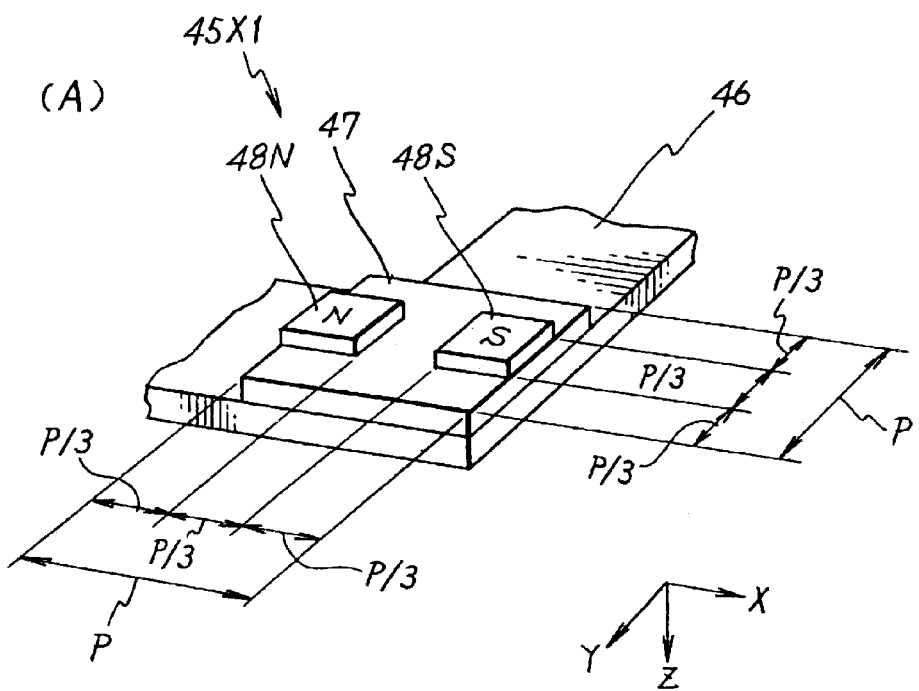
FIGS. 9(A) and 9(B) are diagrams showing the arrangement of a reaction canceling magnetic pole unit.
Figure 9:
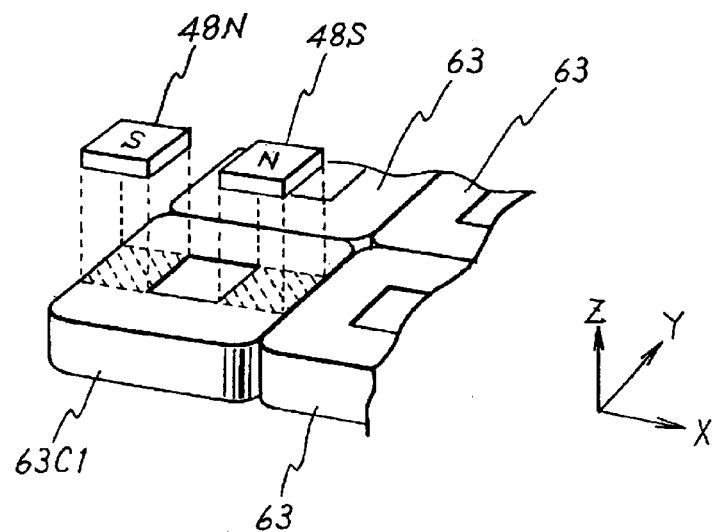

As shown in FIG. 7, partially-broken-out section including the supporting unit 40, the base 21 including the stator 60 comprises a rectangular-shaped container 69, in a planar view, which is shaped like a two-stepped concave and is open in the upper side; a flat-plate-like shaped magnetic member 62 made of a material such as ferrite stainless or carbon steel, fastened to the step portion in the bottom of this container 69 from the above, and attached in the center portion of the height; and a flat-plate-like shaped member 68 made of a non-magnetic and non-conductive material such as ceramic or the like, and attached so that the upper side of the container 69 is closed.

On the upper side surface of the magnetic member 62, a plurality of armature coils 63's are disposed. As an armature unit, the flat-plate-like shaped coil module 61 is composed of these plurality of armature coils 63's, and the stator 60 of the planar motor 50 is composed of the flat-plate-like shaped coil module 61 and the magnetic member 62. The arrangement of armature coils 63's composing the flat-plate-like shaped coil module 61 is described later.

Incidentally, to prevent the temperature increase of the armature coils 63's and other members near them and the fluctuation of the ambient atmosphere of the armature coils 63's, which is due to heat-generation caused by current supply to the armature coils 63's, cooling of the armature coils 63's is performed. Such cooling is realized by making a closed space surrounded by the flat-plate-like shaped member 68, the container 69, and the magnetic member 62 to be a path for a coolant to cool the armature coils 63's of the flat-plate-like shaped coil module 61. Therefore, an inlet opening (not shown) is set on one side of the closed space and an outlet opening (not shown) is set on another side of the close space. A coolant (for example, water or FLUORINERT (product name of Sumitomo-3M Corp.) is sent into the closed space through the inlet opening from a cooling control mechanism (not shown) and heat-exchange with the flat-plate-like shaped coil module 61 is performed upon passing the inside of the closed space, thereby the coolant heated up by the absorption of the heat generated in the flat-plate-like shaped coil module 61 is sent out of the outlet opening.

The flat-plate-like shaped coil module 61 is composed of a plurality of the armature coils 63's arranged in the shape of a matrix as shown in FIG. 8(A), planar view, along with the reaction canceling magnetic pole unit 45X1, 45X2, 45Y1, 45Y2. This armature coil 63 is, as shown in FIG. 8(B), in the shape of a rectangular solid having an almost-square bottom surface with P as the length of one side (parallel to X-Y plane) and having a hole in Z direction around the center axis CX parallel to Z-axis. The cross section of the hole has the shape of a square with P/3 as the length of one side. The current driving unit 22 supplies a current via terminals 64a and 64b for the armature coil 63 and the current flows in almost uniform current density including its inside around the center axis CX. Incidentally, the value and direction of current flowing the armature coil 63 is controlled via the current driving unit 22 by the stage control system 19 and this control is executed for each armature coil 63. Furthermore, in FIG. 8(A), the armature coils 63's have the same structure and armature coils on the four corner opposite with the reaction canceling magnetic pole unit 45X1, 45X2, 45Y1, 45Y2 are particularly shown as armature coils 63C1, 63C2, 63C3, 63C4.

The reaction canceling magnetic pole unit 45X1 is, as shown in FIG. 9(A), composed of a supporting member 46, a flat-plate-like shaped magnetic member 47 made of a material such as ferrite stainless or carbon steel, and two permanent magnets 48N, 48S. Incidentally, FIG. 9(A) is drawn upside down for the convenience.

The supporting member 46, as shown in FIG. 9(A), FIG. 2, and FIG. 8(A), comprises a L-letter-like shaped flat plate portion almost parallel to the flat-plate-like shaped member 68, which is placed on the flat-plate-like shaped member 68; a first column expanding vertically and downwards from one end of the L-letter-like shaped flat plate portion; a second column expanding vertically and downwards from the other end of the L-letter-like shaped flat plate portion; a first fixing portion set in the bottom end of the first column; and a second fixing portion set in the bottom end of the second column. And the supporting member 46 is fixed on a floor independently from the supporting member 40 in the first and second fixing portions. Therefore, the reaction canceling magnetic pole unit 45X1 is mechanically independent from other members composing the exposure apparatus 100.

Referring back to FIG. 9(A), the flat-plate-like shaped magnetic member 47 has the shape of a square with P as the length of one side in a planar view and is fixed by screws, adhesive, etc. in the edge of the L-letter-like shaped flat plate portion of the supporting member 46, which is on the surface opposite with the flat-plate-like shaped member 68.

The permanent magnets 48N, 48S have the shape of a square with P/3 as the length of one side in a planar view, are arranged along X-axis direction in the surface of the flat-plate-like shaped magnetic member 47 opposite with the flat-plate-like shaped member 68, and are fixed by screws, adhesive, or the like. In the permanent magnet 48N, the surface opposite with the flat-plate-like shaped member 68 is N pole, and in the permanent magnet 48S, the surface opposite with the flat-plate-like shaped member 68 is S pole. These permanent magnets 48N, 48S are, as shown in FIG. 9(B), disposed opposite with each other around the center of armature coil 63C1's current path, that is, the winding with respect to Y-axis direction.

The reaction canceling magnetic pole unit 45X2 has the same structure as the reaction canceling magnetic pole unit 45X1, and the reaction canceling magnetic pole unit 45Y1, 45Y2 are composed in the same manner as the reaction canceling magnetic pole unit 45X1 except for permanent magnets 48N, 48S being arranged in Y-axis direction.

Figure 10:
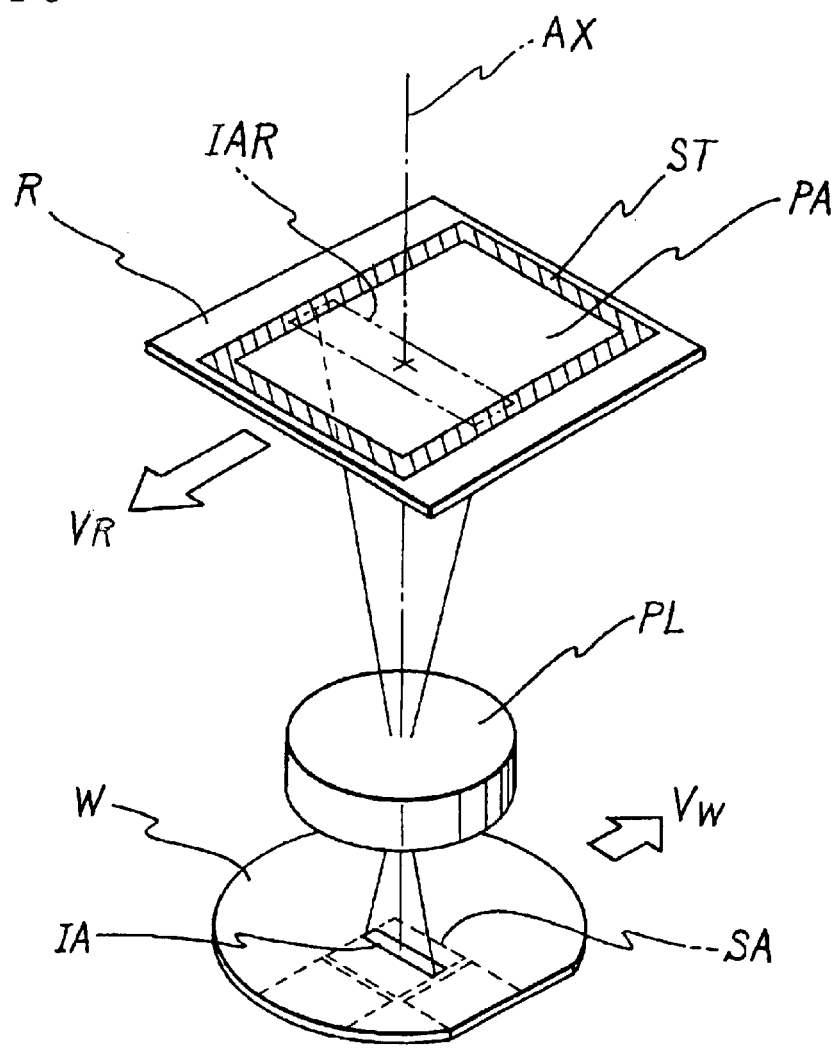
FIG. 10 is a diagram illustrating the principle of the scanning-exposure of the exposure apparatus of FIG. 1.
Figure 11:
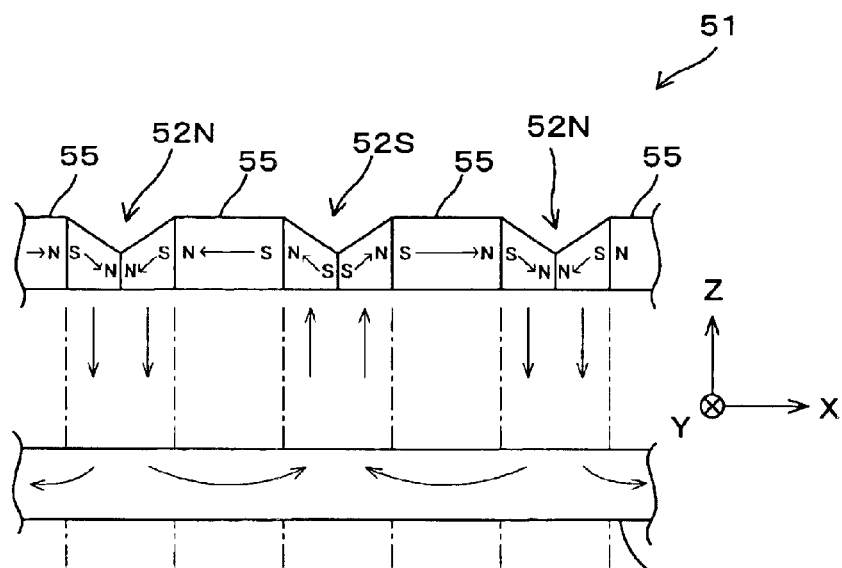
FIGS. 11(A) and 11(B) are diagrams illustrating magnetic circuits with respect to the magnetic pole unit.
Figure 11:
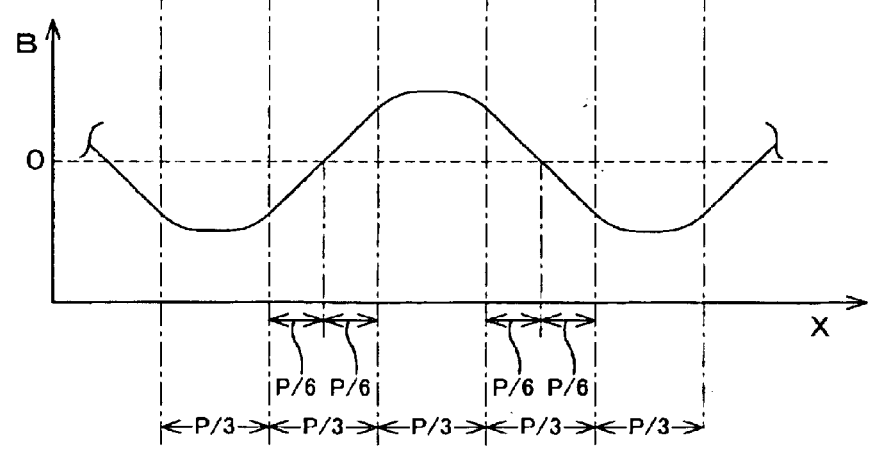
Figure 12:
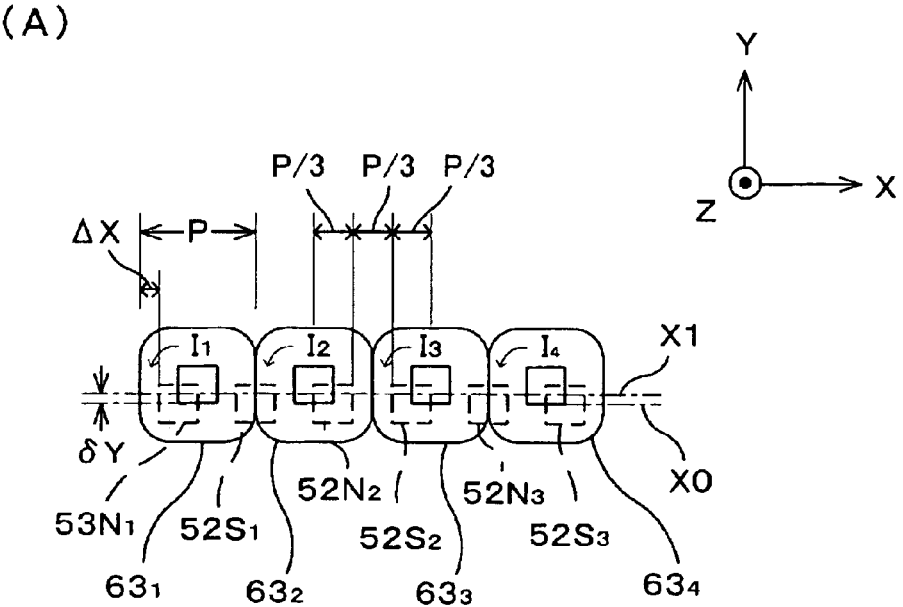
FIGS. 12(A) and 12(B) are diagrams illustrating forces acting on armature coils upon the drive of the mover.
Figure 12:
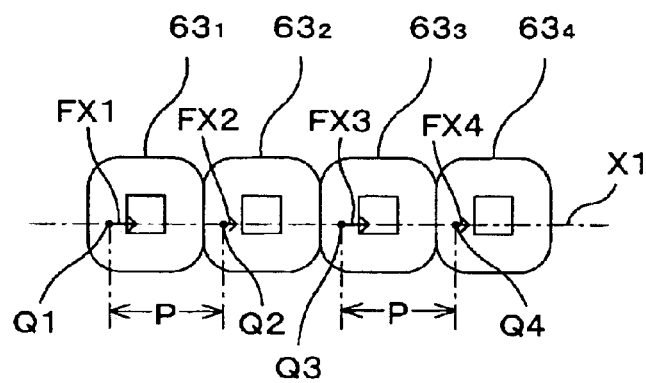
Figure 13:
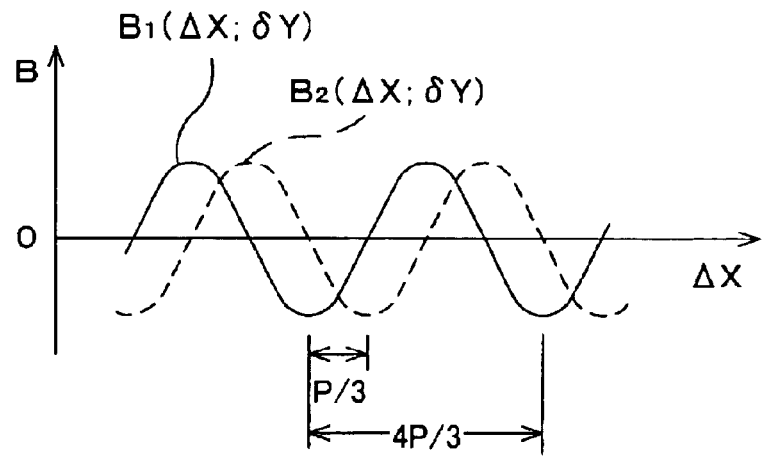
FIGS. 13(A) to 13(C) are diagrams illustrating a magnetic flux density around an armature coil, a supply current to the armature coil, and a force acting on an armature coil upon the drive of the mover.
Figure 13:
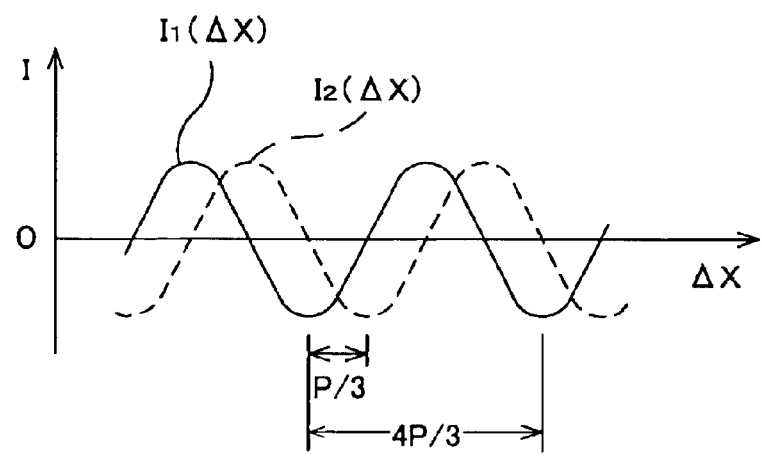
Figure 13:
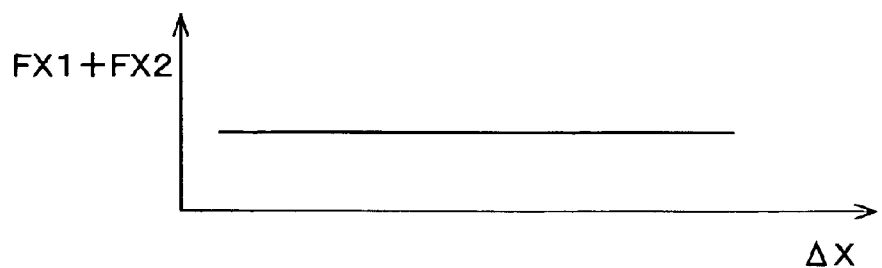

In the exposure apparatus 100 according to the present embodiment, as shown in FIG. 10, the reticle R is illuminated in a rectangular (or slit-like) illumination area IAR of which the longitudinal direction is perpendicular to the scanning direction (Y-axis direction) of the reticle R. The reticle R is scanned at a speed $V_R$ in the (−Y) direction upon exposure. The illumination area IAR (the center of which almost coincides with the optical axis AX) is projected onto the wafer W via the projection optical system PL. A slit-shaped projection area, which is conjugate with the illumination area IAR, that is, the exposure area IA, is formed. The wafer W and the reticle R have an inverted image forming relationship. The wafer W is, thus scanned at a velocity $V_W$ synchronously with the reticle R in the direction opposite to the scanning direction of the reticle R, allowing the entire shot area SA on the wafer W to be exposed. The velocity ratio $V_W/V_R$ of the scanning speed precisely corresponds to the reduction ratio of the projection optical system PL, and the pattern of the pattern area PA of the reticle R is accurately reduced and transferred onto the shot area SA on the wafer W. The width in the longitudinal direction of the illumination area IAR is determined so as to be wider than that of the pattern area PA on the reticle R and to be narrower than the maximum width of the area including the shielding area ST. And by scanning the reticle R, the entire pattern area PA is illuminated.

Hereinafter, the operation of each part of the embodiment during the time when the wafer W is moving will be described. Firstly, the movement of the wafer W in this embodiment, that is, the outline of the principle of driving of the driving magnetic pole unit 51, as a mover, of the planar motor 50, will be described by referring to FIGS. 11 to 13.

In the driving magnetic pole unit 51, as shown by solid arrows in FIG. 11(A) representatively illustrating the case concerning the permanent magnet modules 52N, 52S, the permanent magnet modules 52N, 53N, 54N generate magnetic fluxes in the (−Z) direction (downwards in the figure) and the permanent magnet modules 52S, 53S, 54S generate magnetic fluxes in the (+Z) direction (upwards in the figure). And these permanent magnet modules compose a magnetic circuit together with the permanent magnets 55, 56, and the magnetic member 62. Incidentally, in composing the magnetic circuit, the magnetic member 62 is used in all magnetic circuits, the permanent magnet 55 is used in a magnetic circuit concerning the permanent magnet modules 52N and 52S, and the permanent magnet 56 is used in a magnetic circuit concerning the permanent magnet modules 54N and 54S. Furthermore, the permanent magnet 55 is used in a magnetic circuit concerning the permanent magnet modules 52N and 54S (or 52S and 54N), and the permanent magnet 56 is used in a magnetic circuit concerning the permanent magnet modules 53N and 54S (or 53S and 54N).

In the following, a magnetic circuit concerning the permanent magnets 52N, 52S will be described as an example.

In a magnetic circuit shown in FIG. 11(A), a magnetic flux density B around the magnetic member 62, that is, in Z position where the flat-plate-like shaped coil module 61 is placed, takes a distribution shown in FIG. 11(B). That is, the absolute value of the magnetic flux density B is maximum in positions corresponding to the center points of the permanent magnet modules 52N, 52S, decreases as going from the center points to the periphery of the permanent magnet modules 52N, 52S respectively, and takes zero at the middle between the position corresponding to the center point of the permanent magnet module 52N and the position corresponding to the center point of the permanent magnet module 52S. Furthermore, the distribution of the magnetic flux density B is symmetric in (±)X direction with the positions corresponding to the center points of the permanent magnet modules 52N, 52S as centers. That is, the X-directional distribution of the magnetic flux density B is such that it can be approximated by a sine function or trapezoidal function. Incidentally, in FIG. 11(B), when the direction of the magnetic flux is (+Z) direction, the value of the magnetic flux density B takes positive, and when the direction of the magnetic flux is (−Z) direction, the value of the magnetic flux density B takes negative. Furthermore, the same distribution as the X-directional distribution of the magnetic flux density B that FIG. 11(B) shows is true in Y direction as well.

Incidentally, in the present embodiment, as a material for magnetic members, for example, ferrite stainless, carbon steel, or the like which is of high resistance, high saturation magnetic flux density, low magnetic hysteresis, and low coercive force is used, thereby it is possible to decrease eddy currents, hysteresis losses, and magnetic resistance and successively generate a magnetic flux of high magnetic flux density even when the driving magnetic pole unit 51 is moving.

In the following, the driving of the mover 51 by Lorentz force generated by an interaction between a magnetic flux, between the driving magnetic pole unit 51 and the magnetic member 62, and a current flowing the armature coil 63 will be described.

Under the environment of the magnetic flux density B having the distribution shown in FIG. 11(B), when a current is supplied to the armature coil 63, a Lorentz force is generated in the armature coil 63. The magnitude and direction of the Lorentz force vary depending on a positional relation between the driving magnetic pole unit 51 and the flat-plate-like shaped coil module 61. Assume that, firstly, the positional relation between the driving magnetic pole unit 51 and the flat-plate-like shaped coil module 61 is a positional relation, shown in FIG. 12(A), among armature coils $63_1$, $63_2$, $63_3$, $63_4$, . . . , permanent magnets $52N_1$, $52N_2$, . . . , and permanent magnets $52S_1$, $52S_2$, . . . to consider the Lorentz force. Incidentally, in FIG. 12(A), the armature coils $63_1$, $63_2$, $63_3$, $63_4$ are drawn by solid lines and the permanent magnets $52N_1$, $52N_2$, $52S_1$, $52S_2$ are drawn by dashed lines.

That is, assume that the armature coils $63_1$, $63_2$, $63_3$, $63_4$ are sequentially arranged in X direction and the permanent magnets $52N_1$, $52N_2$, $52S_1$, $52S_2$ are sequentially arranged along X0-axis parallel to X direction. Furthermore, assume that, in FIG. 12(A), the left edge of the armature coil $63_1$ and the left edge of the permanent magnets $52N_1$ are apart from each other by a distance $\Delta X$.

In such a arrangement-relation, pay attention to points Q1, Q2, Q3, Q4 in the armature coils $63_1$, $63_2$, $63_3$, $63_4$, shown in FIG. 12(B), which are along X1-axis parallel to the X0-axis. Furthermore, assume that, as illustrated in FIG. 12(A), the X0-axis and the X1-axis are apart from each other by a distance $\delta Y$ in Y direction, the point Q1 and the point Q2 are apart from each other by a distance P in X direction, and the point Q3 and the point Q4 are apart from each other by a distance P in X direction.

When the driving magnetic pole unit 51 has moved in X direction, that is, the distance $\Delta X$ changes, a magnetic flux density $B_1$ ($\Delta X$; $\delta Y$) in the point Q1 changes in a way shown by a solid line in FIG. 13(A). Such a change is the same as in FIG. 11. Now, assuming the distribution in the FIG. 11 to be well approximated by a sine function, the magnetic flux density $B_1$ ($\Delta X$; $\delta Y$) is given by $$B_1 (\Delta X; \delta Y) = B_0(\delta Y) \times \sin\{(3\pi/2P)\Delta X + \phi\} \quad (1).$$

The value $\phi$ is a constant determined by X position of the point Q1, $B_0$ ($\delta Y$) is a constant determined according to $\delta Y$.

Furthermore, when the driving magnetic pole unit 51 has moved in X direction, that is, the distance $\Delta X$ changes, a magnetic flux density $B_2$ ($\Delta X$; $\delta Y$) in the point Q2 changes in a way shown by a dashed line in FIG. 13(A). Now, assuming the distribution to be well approximated by a sine function, the magnetic flux density $B_2$ ($\Delta X$; $\delta Y$) is given by $$B_2(\Delta X; \delta Y) = -B_0(\delta Y) \times \cos\{(3\pi/2P)\Delta X + \phi\} \quad (2).$$

$B_2(\Delta X; \delta Y)$ is obtained by shifting $B_1(\Delta X; \delta Y)$ in X direction by ¼ of the period.

When supplying a current $I_1(\Delta X; \delta Y)$ shown by a solid line in FIG. 13(B) and given by $$I_1(\Delta X) = I_0 \sin\{(3\pi/2P)\Delta X + \phi\} \quad (3)$$

for the armature coil $63_1$, and supplying a current $I_2(\Delta X; \delta Y)$ shown by a dashed line and given by $$I_2(\Delta X) = -I_0 \cos\{(3\pi/2P)\Delta X + \phi\} \quad (3)$$

for the armature coil $63_2$, assuming that $I_1(\Delta X)$ flows only in Y-axis direction in the point Q1 and $I_2(\Delta X)$ flows only in Y-axis direction in the point Q2, the X-component FX1 $(\Delta X; \delta Y)$ of Lorentz force per a unit-length generated in the point Q1 shown in FIG. 12(B) is given by $$FX1(\Delta X; \delta Y) = B_1(\Delta X; \delta Y) \times I_1(\Delta X) \quad (5),$$

and the X-component FX2 $(\Delta X; \delta Y)$ of Lorentz force per a unit-length generated in the point Q2 shown in FIG. 12(B) is given by $$FX2(\Delta X; \delta Y) = B_2(\Delta X; \delta Y) \times I_2(\Delta X) \quad (6).$$

Then, the resultant force, $F(\delta Y)$, of FX1 $(\Delta X; \delta Y)$ and FX2 $(\Delta X; \delta Y)$ is given by $$F(\delta Y) = B_0(\delta Y) \times I_0 \quad (7).$$

That is, also when the driving magnetic pole unit 51 moves, the resultant force from the X-component of Lorentz force per a unit-length in the point Q1 and the X-component of Lorentz force in the point Q2 is constant independently of the X-position of the driving magnetic pole unit 51, that is, the distance $\Delta X$ as shown in FIG. 13(C).

In the above description, it was assumed that all currents flow in Y-axis direction in the points Q1 and Q2. However, currents in the points Q1 and Q2 can have a X-component. In such a case, considering that the directions of currents in the points Q1 and Q2 are parallel to each other due to the periodicity of the arrangement of the armature coils 63's, by supplying currents different from each other in phase by ¼ of the period to the armature coils $63_1$, $63_2$, the X-component of the resultant force from the Lorentz force per a unit-length in the point Q1 and the Lorentz force in the point Q2 is constant independently of the X-position of the driving magnetic pole unit 51.

Furthermore, the selection of the point Q1 in the armature coil $63_1$ is arbitrary and the point Q2 corresponding to the point Q1 is uniquely determined in the armature coil $63_2$ by all means. Accordingly, by controlling the current $I_1(\Delta X)$ supplied to the armature coil $63_1$ and the current $I_2(\Delta X)$ supplied to the armature coil $63_2$ to respectively satisfy the equations (3) and (4), the X-component of the resultant force from the Lorentz force generated in the armature coil $63_1$ and the Lorentz force in the armature coil $63_2$, can be constant independently of the X-position of the driving magnetic pole unit 51. Incidentally, the magnitude of X-component of the resultant force can be controlled by changing the value $I_0$ in the equations (3) and (4).

When exchanging the points Q1, Q2 with the points Q3, Q4, it is easy to understand that also when applying the same current-control as the armature coils $63_1$, $63_2$ to the armature coils $63_3$, $63_4$, the X-component of the resultant force of the Lorentz forces can be controlled to be constant independently of the X-position of the driving magnetic pole unit 51 in the same manner as in the armature coils $63_1$, $63_2$. Incidentally, the amount of X-component of the resultant force can be controlled by changing the value $I_0$ in the equations (3) and (4). Furthermore, when applying the same current-control as the armature coils $63_1$, $63_2$ to any two armature coils 63's adjacent to each other, the X-component of the resultant force of the Lorentz forces can be controlled to be constant independently of the X-position of the driving magnetic pole unit 51.

Therefore, by selecting a pair of two armature coils adjacent to each other in X direction according to the X-position of the driving magnetic pole unit 51 and controlling the currents of each pair of the armature coils 63's to satisfy the equations (3) and (4), the driving magnetic pole unit 51 can be driven in X direction by a arbitrary and constant driving force independently of the X-position of the driving magnetic pole unit 51.

Incidentally, considering a pair of the armature coils 63's, when supplying currents to drive the driving magnetic pole unit 51 in X direction, generally a force to drive the driving magnetic pole unit 51 in Y direction and a torque around Z-axis are generated. Therefore, the current of each armature coil 63 is so adjusted that a force to drive the driving magnetic pole unit 51 in Y direction and a torque become zero as a whole.

Furthermore, in the above, a case where X-directional distribution of a magnetic flux density B around the flat-plate-like shaped coil module 61 is well approximated by a sine function is described, however, if such an approximation is not appropriate, instead of the equations (3) and (4), the currents $I_1(\Delta X)$, $I_2(\Delta X)$ supplied to the armature coils $63_1$, $63_2$ can be determined by using the following equations:

$$I_1(\Delta X) = C_0 \sin^2\{(3\pi/2P)\Delta X + \phi\}/B_1(\Delta X; \delta Y) \quad (8)$$

$$I_2(\Delta X) = C_0 \cos^2\{(3\pi/2P)\Delta X + \phi\}/B_2(\Delta X; \delta Y) \quad (9).$$

$C_0$ is a constant.

Using these equations, the resultant force, $F(\delta Y)$, of FX1 $(\Delta X; \delta Y)$ and FX2 $(\Delta X; \delta Y)$ is given by $$F(\delta Y) = C_0(\delta Y) \quad (10).$$

That is, also when the driving magnetic pole unit 51, the X-component of the resultant force from the Lorentz force generated in the point Q1 and the Lorentz force in the point Q2 can be constant.

In the above case where the driving magnetic pole unit 51 moves in X direction, the X-directional drive of the driving magnetic pole unit 51 is described. Also about the Y-directional drive of the driving magnetic pole unit 51, the driving magnetic pole unit 51 can be driven by a constant driving force in Y direction independently of the Y-position of the driving magnetic pole unit 51 in the same manner as in X direction. That is, by adaptively selecting a pair of two armature coils 63's adjacent to each other in Y direction and controlling currents according to similar equations to the equations (3) and (4), or the equations (8) and (9), besides, by controlling currents so that the driving force to drive the driving magnetic pole unit 51 in X direction becomes zero and the torque of the driving magnetic pole unit 51 is cancelled as a whole, the driving magnetic pole unit 51 can be driven by a constant driving force in Y direction independently of the Y-position of the driving magnetic pole unit 51.

Furthermore, by supplying a current having a pattern, which is obtained by superposing a current-pattern of X-directional drive on a current-pattern of Y-directional drive with an appropriate rate, to each armature coil 63, the driving magnetic pole unit 51 can be driven in any direction on X-Y plane by a driving force having an arbitrary magnitude.

Furthermore, by driving the driving magnetic pole unit 51 without canceling the torque, the driving magnetic pole unit 51 can be rotationally driven in a desired direction by a desired torque.

Therefore, according to the planar motor 50 of the present embodiment, making use of the advantages of the Lorentz force method that is excellent in controllability, linearity of thrust, and positioning accuracy, the light-weight driving magnetic pole unit 51 can be driven in any direction on X-Y plane by a driving force having an arbitrary magnitude.

In the stage unit 30 of the present embodiment, as described above, the substrate table 18 that holds a wafer W via the wafer holder 25 is attached to the driving magnetic pole unit 51. Thus, by controlling the drive of the driving magnetic pole unit 51 via the stage controller 19 as described above, the main controller 20 can move the substrate table 18 and the wafer W integrally with the driving magnetic pole unit 51 freely on the X-Y plane. More specifically, when the driving magnetic pole unit, that is, the substrate table 18 is moved in a desired direction by using a desired thrust, the main controller 20 monitors the measurement values of the wafer interferometer 31 (positional information or the velocity information) via the stage control system 19, and obtains the relative-position relationship between the mover 51 and the stator within the X-Y plane. And the main controller 20 calculates and determines the value and direction of a current to be supplied to each armature coil 63 in accordance with the obtained relative-position information and the target position to which the substrate table 18 is to be driven, and then the main controller 20 sends instructions to the stage control system 19. Consequently, the stage control system 19 controls the value and direction of the electric current to be supplied to each armature coil 63 via the current driving unit 22 (not shown). In this case, the main controller 20 also controls the speed of the substrate table 18 in accordance with the distance to the target position.

The main controller 20 may calculate the value and direction of the current to be supplied to each armature coil 63, at each time-point of move, according to the positional information (or velocity information) sent by the wafer interferometer 31. However, if its control response time is not short enough, the main controller 20 may calculate the value and direction of the current to be supplied to each armature coil 63 correspondingly to the passage of time, that is, the move of the mover 51 at the start of the move so that the wafer W takes a desired locus and speed in a certain subsequent time-period. In this case, the main controller 20 calculates the deviation of the wafer W from the desired locus based on the positional information (or velocity information) sent from the wafer interferometer 31, corrects the value and direction of the current to be supplied to each armature coil 63, and calculates the value and direction of the current for a predetermined time-period subsequent to the correction in time series. Then, the stage system 19 controls the current of each armature coil 63 according to the corrected information.

In the present embodiment, in the drive of the driving magnetic pole unit 51, the stage control system 19 detects the armature coil 63 opposite with the driving magnetic pole unit 51 according to the positional information (or velocity information) sent from the wafer interferometer 31 and controls the current driving unit 22 so that the current to drive the driving magnetic pole unit 51 is supplied only to that armature coil 63. Therefore, because the current is not supplied to an armature coil 63 to generate no or weak Lorentz force, the current consumption can be efficiently reduced maintaining the driving force.

Figure 14:
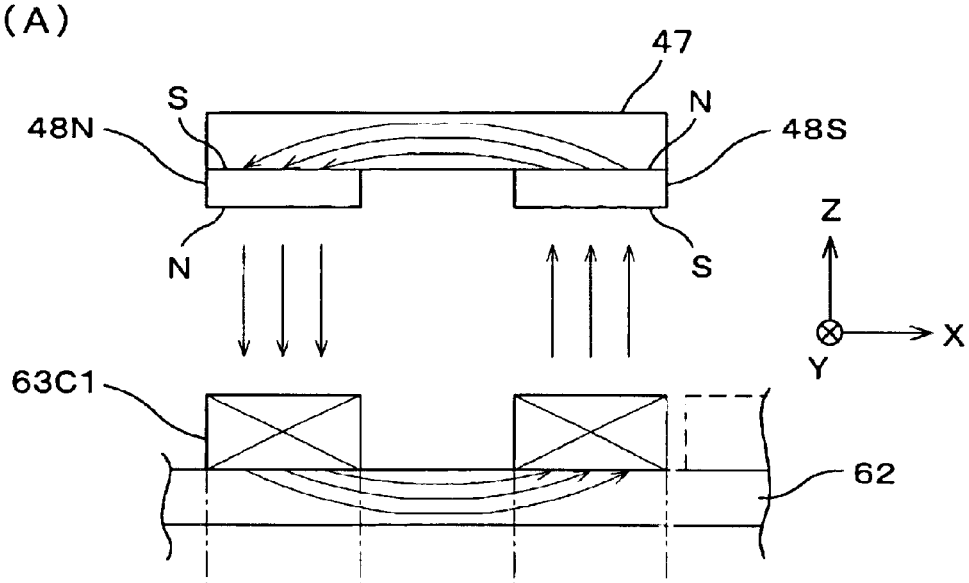
FIGS. 14(A) and 14(B) are diagrams illustrating a magnetic circuit with respect to a reaction canceling magnetic pole unit.
Figure 14:
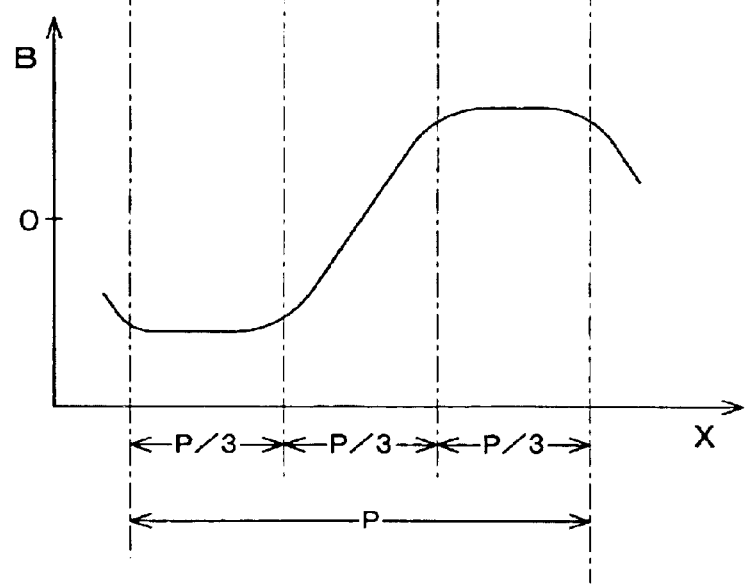
Figure 15:
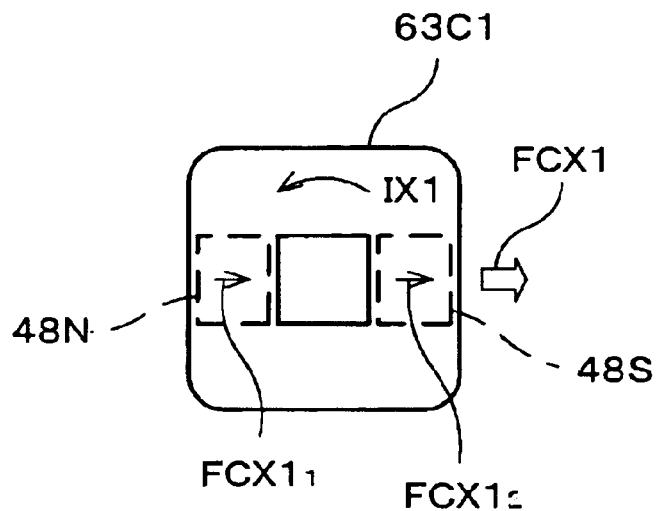
FIGS. 15(A) and 15(B) are diagrams illustrating forces acting on an armature coil upon the canceling of the reaction.
Figure 15:
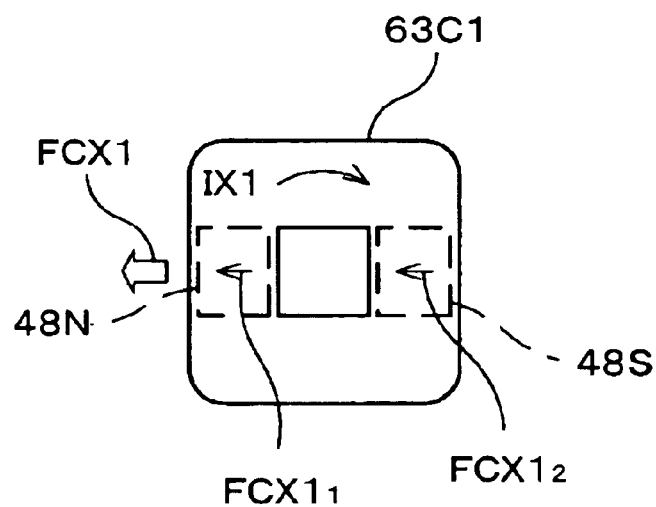

Next, concerning the present embodiment, an outline about the principle of canceling of the reaction acting on the stator 60 will be described referring to FIG. 14 to FIG. 16.

In the reaction canceling magnetic pole unit 45X1, as shown by solid arrows in FIG. 14(A), the permanent magnet 48N generates a magnetic flux in (−Z) direction (downwards in the FIG. ), and the permanent magnet 48S generates a magnetic flux in (+Z) direction (upwards in the FIG. ). And a magnetic circuit in which the magnetic flux flows sequentially in the permanent magnet 48N, the magnetic member 62, the permanent magnet 48S, and the magnetic member 47 is formed.

In this case, around the-upper surface of the magnetic member 62, that is, Z position where a armature coil 63C1 being one of the armature coils 63's constituting the flat-plate-like shaped coil module 61 is placed, the magnetic flux density B takes a distribution shown in FIG. 14(B). That is, the absolute value of the magnetic flux density B is maximum at positions corresponding to the centers of the permanent magnets 48N, 48S, and as going out from the positions to positions corresponding to the peripheries of the permanent magnets, the absolute value of the magnetic flux density B decreases. Then at the middle between the position corresponding to the center of the permanent magnets 48N and the position corresponding to the center of the permanent magnets 48S, the absolute value of the magnetic flux density B takes zero. Furthermore, the distribution of the magnetic flux density B is point-symmetric with the positions corresponding to the center points of the permanent magnet modules 48N, 48S as centers. Incidentally, in FIG. 14(B), the value of the magnetic flux density B is positive when the direction of the magnetic flux is (+Z) direction and the value of the magnetic flux density B is negative when the direction of the magnetic flux is (−Z) direction.

Moreover, at Z position where a armature coil 63C1 is placed, the reaction canceling magnetic pole unit 45X1 generates the same magnetic flux density B as in FIG. 14(B).

Furthermore, at Z positions where armature coils 63C2, 63C4 are placed, the reaction canceling magnetic pole units 45Y1, 45Y2 generate a magnetic flux density B of which the distribution has the X-direction in FIG. 14(B) changed to Y-direction.

Under the environment of a magnetic flux density B having the distribution shown in FIG. 14(B), when a left-handed current IX1, in a planar view, shown in FIG. 15(A) is supplied to the armature coil 63C1, by an electro-magnetic interaction, a Lorentz force $FCX1_1$ is generated in (+X) direction in an opposite portion of the armature coil 63C1 with the permanent magnet 48N and a Lorentz force $FCX1_2$ is generated in (+X) direction in an opposite portion of the armature coil 63C1 with the permanent magnet 48S. Consequently, the resultant force of the Lorentz force $FCX1_1$ and $FCX1_2$ acts on the armature coil 63C1 in (+X) direction, and is applied to the stator. In this way, the force FCX1 can be generated along the same plane as a plane along which the reaction acting on the stator 60 due to the drive of the magnetic pole unit 51, that is, the Lorentz force generated in the armature coil 63 is. Incidentally, the magnitude of the force FCX1 is proportional to the current IX1.

Moreover, when a right-handed current IX1, in a planar view, shown in FIG. 15(B) is supplied to the armature coil 63C1, by an electromagnetic interaction, a Lorentz force $FCX1_1$ is generated in (−X) direction in an opposite portion of the armature coil 63C1 with the permanent magnet 48N and a Lorentz force $FCX1_2$ is generated in (−X) direction in an opposite portion of the armature coil 63C1 with the permanent magnet 48S. Consequently, the resultant force of the Lorentz force $FCX1_1$ and $FCX1_2$ acts on the armature coil 63C1 in (−X) direction, and is applied to the stator.

That is, by controlling the direction and magnitude of the current supplied to the armature coil 63C1, the force FCX1 of a desired magnitude in a desired direction, (+X) or (−X) direction, is applied to the placement-position of the armature coil 63C1 of the stator 60.

Figure 16:
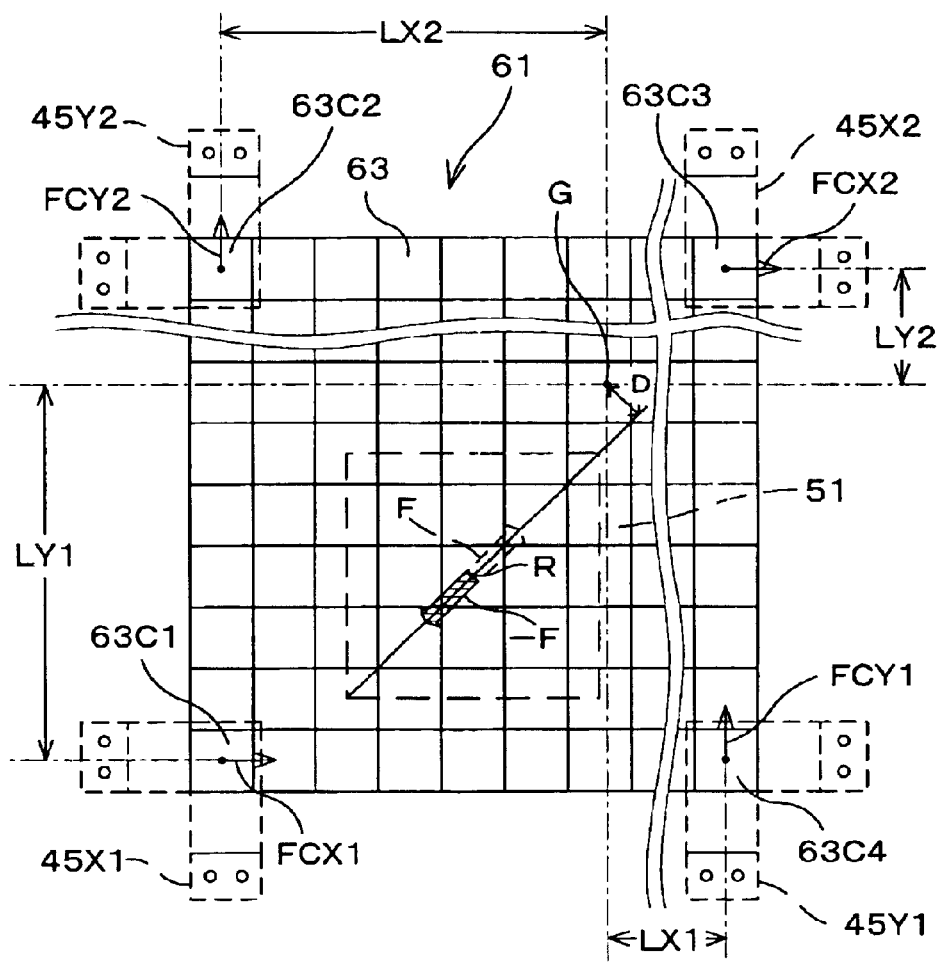
FIG. 16 is a diagram illustrating the action of reaction canceling.

Moreover, also in the armature coil 63C3, in the same manner as the armature coil 63C1, by controlling the direction and magnitude of the current supplied to the armature coil 63C3, the force FCX2 of a desired magnitude in a desired direction, (+X) or (−X) direction, is applied to the placement-position of the armature coil 63C3 of the stator 60 (refer to FIG. 16).

Furthermore, also in the armature coil 63C2, 63C4, in the same manner as the armature coil 63C1, by controlling the directions and magnitudes of the current supplied to the armature coils 63C2, 63C4, the forces FCY1, FCY2 of a desired magnitude in a desired direction, (+X) or (−X) direction, are applied to the respective placement-positions of the armature coils 63C2, 63C4 of the stator 60 (refer to FIG. 16).

Incidentally, as shown in FIG. 16, when the driving magnetic pole unit 51 is driven by a force F, a reaction (−F) acts on point R of the stator. Now, represent the X-component of the reaction (−F) by (−FX), the Y-component of the reaction (−F) by (−FY), and the distance between a line along which the reaction (−F) is and the gravity center G of the stator 60 by D.

To cancel such a reaction, representing the X-components of the forces FCX1, FCX2 by CX1, CX2, the Y-components of the forces FCY1, FCY2 by CY1, CY2, and the magnitude of the reaction by F, then, forces FCX1, FCX2, FCY1, FCY2 given by the following equations should be applied:

$$FX = CX1 + CX2 \quad (11)$$

$$FY = CY1 + CY2 \quad (12)$$

$$F \cdot D = CX1 \cdot LY1 - CX2 \cdot LY2 + CY1 \cdot LX1 - CY2 \cdot LX2. \quad (13)$$

Incidentally, the Y-directional distances between the gravity center G and the respective points where the forces FCX1, FCX2 are applied are represented by LY1, LY2 and the X-directional distances between the gravity center G and the respective points where the forces FCY1, FCY2 are applied are represented by LX1, LX2.

In the above equations (11) to (13), because the number of unknown variables (CX1, CX2, CY1, CY2) is four and the number of the equations is three, a solution can be found. By choosing a group of FCX1, FCX2, FCY1, FCY2 satisfying the equations (11) to (13) and supplying currents to generate them to the armature coils 63C1, 63C2, 63C3, 63C4, the reaction acting on the stator 60 due to the drive of the driving magnetic pole unit 51 can be cancelled. Incidentally, the exposure apparatus 100 of the present embodiment chooses one that makes the total amount of supply-currents smaller out of groups of FCX1, FCX2, FCY1, FCY2 satisfying the equations (11) to (13).

In the exposure apparatus 100 of the present embodiment, the main control unit 20, via the stage control system 19 and the current driving unit 22, drives the driving magnetic pole unit 51 by supplying the current to the armature coil 63 opposite with the driving magnetic pole unit 51 as described above, and simultaneously cancels the reaction that is known to itself and acts on the stator 60 by applying the forces FCX1, FCX2, FCY1, FCY2 that are generated by the electromagnetic interaction and satisfy the equations (11) to (13). Accordingly, because the force to accurately cancel the reaction is applied to the stator 60 with no delay-time from the act of the reaction, the reaction acting on the stator 60 due to the drive of the driving magnetic pole unit 51 can be very accurately cancelled.

Incidentally, in the above, the cancellation of the reaction in the translational drive is described. In the case of a rotational drive, two kinds of reactions act on the stator 60. In this case, the entire reaction can be cancelled by calculating forces to cancel the respective reactions and applying the resultant force of those forces to the stator.

Moreover, the reaction canceling magnetic pole units 45X1, 45X2 45Y1, 45Y2 are fixed on a floor, etc. via the respective supporting members 46's independently of the stator and the other elements of the exposure apparatus 100. Therefore, although, when applying the forces FCX1, FCX2, FCY1, FCY2 to the stator 60 to cancel the reaction acting on the stator due to the drive of the driving magnetic pole unit 51, reactions against those forces come to act on the reaction canceling magnetic pole units 45X1, 45X2 45Y1, 45Y2, the reactions do not cause the vibration of the stator 60, the supporting member 40, and the like. Therefore, positional information (or the velocity information) detected by the reticle interferometer 16 fixed on the supporting member and the wafer interferometer 31 does not include the effect of the drive of the driving magnetic pole unit 51.

Next, the brief description of the flow of a exposure operation in the exposure apparatus 100 including the aforementioned stage unit will be presented.

First, a reticle R, on which a pattern to be transferred is formed, is loaded onto the reticle stage RST by a reticle loader. Similarly, a wafer W to be exposed is loaded onto the substrate table 18 by a wafer loader.

At this point, the substrate table 18 is supported by air levitation at a predetermined wafer loading position on the base 21. The main controller 20 servo-controls the substrate table 18 via the stage system 19 based on the measurement value of the wafer interferometer, so that the substrate table 18 stays positioned at the loading position for a predetermined period of time. When the substrate table 18 is staying at the loading position, the electric current is supplied to each armature coil 63 of the stator 60 of the planar motor 50. Accordingly, the main controller 20 cools each armature coil 63 via a cooling device, etc. so as to prevent the temperature of the armature coil 63 from rising due to the generated heat.

Next the main controller 20 prepares for a reticle alignment and a base line measurement in a predetermined procedure, by using what is called a reticle microscope (not shown), a reference mark plate (not shown in Figures) mounted on the substrate table 18, and an alignment detecting system (not shown). And by using the alignment detection system, alignment measurement such as EGA (Enhanced Global Alignment) of which the details are disclosed in the Japan Patent Laid Open No. 61-44429 and the corresponding U.S. Pat. No. 4,780,617 is performed. During such operations, when the wafer W needs to be moved, the main controller 20 controls the current supplied to the each armature coil 63 within the stage unit via the stage control system 19 and moves the mover 51 so as to move the wafer W. Simultaneously with the drive of the driving magnetic pole unit 51, the main controller 20 controls the currents of the armature coils 63C1, 63C2, 63C3, 63C4 in the stage unit via the stage control system, and cancels the reaction acting on the stator 60 due to the drive of the driving magnetic pole unit 51. After completing such alignment measurement, a step-and-scan exposure is performed, in the following manner. The disclosures, cited above are fully incorporated by reference herein as long as the national laws in designated states or elected states, to which this international application is applied, permit.

Upon exposure, first of all, the substrate table 18 is moved so that the X-Y position of the wafer W is positioned at a scanning starting position of the first shot area (first shot). This movement is performed by the main controller 20 controlling the current supplied to each armature coil 63 (including the armature coils 63C1, 63C2, 63C3, 63C4) constituting the planar motor 50 via the stage control system 19, as described above. Simultaneously, the reticle stage RST is moved so that the X-Y position of the reticle is at a scanning starting position. This movement is performed by the main controller 20 via the stage control system 19 and the reticle driving portion (not shown).

Then, the stage control system 19 synchronously moves the reticle R and the wafer W via the reticle driving portion (not shown) and the planar motor 50 while canceling the reaction acting on the stator 60. This is performed in accordance with the X-Y positional information of the reticle R measured by the reticle interferometer 16, and the X-Y positional information of the wafer W, which is measured by the wafer interferometer 31. With this synchronized movement of the reticle and the wafer, scanning exposure is performed.

When the transfer of a reticle pattern onto a shot area by scanning exposure controlled as described above is completed, the substrate table 18 is stepped by a distance of one shot area. Then, scanning exposure is performed on the next shot area. Also in this stepping, the reaction acting on the stator 60 is cancelled according to the X-Y positional information of the wafer W, which is measured by the wafer interferometer 31 while moving the wafer W by the planar motor 50.

The stepping operation and scanning exposure are repeatedly performed in sequence, thus, transferring the necessary number of patterns onto the wafer W. Therefore, with the exposure apparatus 100 according to this embodiment, by using the stage unit having the planar motor 50, the positioning of the wafer W can be achieved with high accuracy at a high speed. As a consequence, the exposure with high exposure precision can be achieved, improving the throughput. That is, by having the exposure apparatus 100 of the present embodiment comprise the planar motor 50 and other elements such as the illumination system 10, the projection optical system PL, etc. shown in FIG. 1, the exposure apparatus with high exposure precision and improved throughput can be realized.

Incidentally, according to this embodiment, the permanent magnets are disposed in the mover (driving magnetic pole unit) and the reaction canceling magnetic pole unit, and the armature coils are disposed in the stator, however, it is possible that the armature coils are disposed in the mover (driving magnetic pole unit) and the reaction canceling magnetic pole unit, and the permanent magnets are disposed in the stator.

Moreover, according to this embodiment, the mover is levitated from the stator by the air guide mechanism. However, also an electromagnetic levitation mechanism can be used. Moreover, electromagnets equivalent to permanent magnets can be used instead of the permanent magnets.

Furthermore, according to this embodiment, on each of the four corners of the stator, the reaction canceling magnetic pole units are placed, however, even if those are placed on three of the four corners, the reaction can be canceled. Moreover, even if, on any three or more points, the reaction canceling magnetic pole units to generate forces that are not in the same direction are placed, the reaction can be canceled.

Furthermore, in this embodiment, a liquid coolant is used for cooling the armature coils. However, as long as it is a fluid that can serve as a coolant, a gas coolant may be used.

Figure 17:
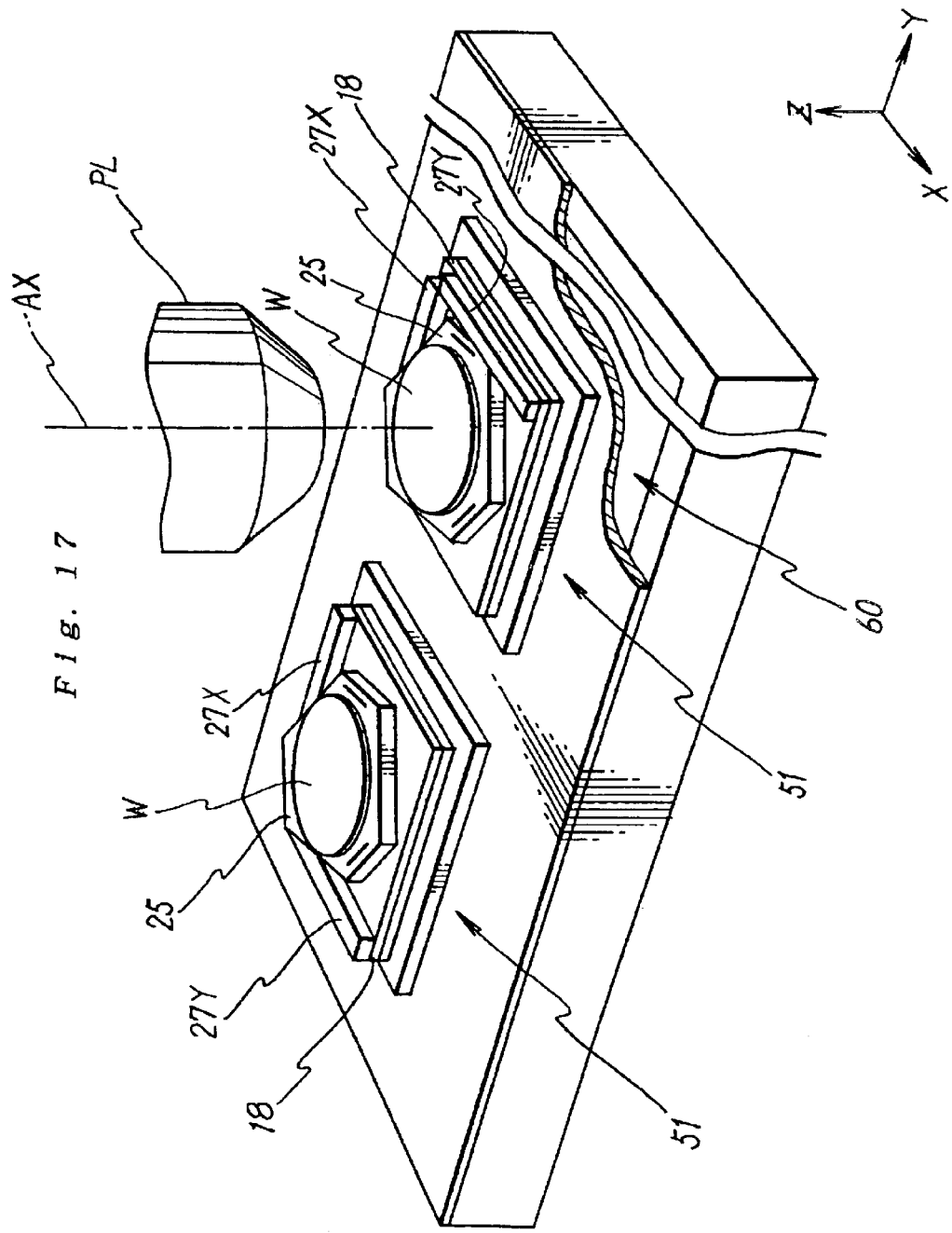
FIG. 17 is a diagram illustrating a variation of the present invention.

Additionally, the number of the driving magnetic pole units 51's as a mover arranged on the stator is not limited to 1. For instance, as illustrated in FIG. 17, two driving magnetic pole units 51's may be arranged on a stator 60, then the two driving magnetic pole units can be driven independently so that the exposure of a wafer can be performed by using one driving magnetic pole unit 51, whereas having the other driving magnetic pole unit 51 to perform the delivery, etc. of the wafer. In such a case, although two or more kinds of reactions act on the stator, the reactions can be canceled by calculating forces to cancel the respective reactions and applying the resultant force of them to the stator similarly with the embodiment described above.

Moreover, the stage unit 30 according to the embodiment is applicable to the reticle stage RST. In this case, the aforementioned reaction frame can be omitted.

The exposure apparatus 100 according to the embodiment can be made by having the reticle stage RST comprising plenty of mechanical elements, the projection optical system PL comprising a plurality of lenses, and the base 21 mounted on the supporting member 40, having other elements, such as the stage unit 30 and the reaction canceling magnetic pole unit 45X, 45Y, than the base 21 attached to the base 21, and having a comprehensive adjustment (electric adjustment, function confirmation, etc.) performed. Also, the base 21 may be attached independently of the supporting member 40.

Incidentally, it is preferred that the making of the exposure apparatus 100 is performed in a clean room where the temperature, the degree of cleanness, etc. are controlled.

Furthermore, the present invention can be applied to all of wafer exposure apparatuses, liquid crystal exposure apparatuses, etc. such as a reduced projection exposure apparatus using ultraviolet light as its light source, a reduced projection exposure apparatus using a soft X-ray of which the wavelength is 10 nm or so as its light source, a reduced projection exposure apparatus using X-rays of 1 nm or so in wavelength as its light source, an exposure apparatus using EB (Electron Beams) or ion beams. Furthermore, the present invention may be applied to a step-and-repeat type apparatus, a step-and-scan type apparatus, and a step-and-stitch type apparatus. However, in the case when this invention is applied to a reduced projection exposure apparatus using a soft X-ray of which the wavelength is 10 nm or so as its light source, a reduced projection exposure apparatus using X-rays of 1 nm or so in wavelength as its light source, an exposure apparatus using EB (Electron Beams) or ion beams, where the surrounding environment of the wafer and the like need to be in vacuum, it is necessary to employ the magnetic levitation mechanism because the air guide mechanism can not be used as the levitation mechanism to levitate the mover from the stator.

Industrial Applicability

As described above, the stage unit according to the present invention applies the force to cancel the reaction acting on the stator due to the drive of the mover to the stator by the electromagnetic interaction and the mover is made light weight by composing the magnetic pole unit, that composes the mover, by combining magnets having such magnetization-directions that their magnetic flux are toward the stator and magnets having magnetization-directions crossing the aforementioned magnetization-directions without using yoke material, thereby the vibration of the stator can be prevented even upon the high speed drive of the mover. Therefore, the stage unit is suitable for performing the highly precise positioning control while moving a placed sample.

Furthermore, the exposure apparatus according to the present invention controls the position of the wafer, etc. accurately and at a high speed, therefore the exposure apparatus is suitable for highly accurate exposure.

What is claimed is:

1. A stage unit having a movable stage comprising:
   a driver that includes a mover and a stator to drive the movable stage; and
   a reaction canceling mechanism that applies to the stator a force to cancel a reaction acting on the stator due to driving of the mover by an electromagnetic interaction at least a part of the reaction canceling mechanism being disposed above the stator.

2. The stage unit according to claim 1, wherein the reaction canceling mechanism generates forces, which cancel the reaction as a whole, in at least two points of the stator.

3. The stage unit according to claim 2, wherein the reaction acting on the stator and the forces generated in at least two points are along a plane.

4. The stage unit according to claim 2, wherein the reaction canceling mechanism generates forces, which cancel the reaction as a whole and have respective predetermined directions, in at least three points of the stator.

5. The stage unit according to claim 1, wherein the driver generates a driving force of the mover by an electromagnetic interaction.

6. The stage unit according to claim 5, wherein
   the stator comprises an armature unit including a plurality of armature coils that are arranged in the shape of a matrix and have current paths almost parallel to the predetermined plane, and
   the mover comprises a driving magnetic pole unit that generates a magnetic flux having a direction that cross the predetermined plane.

7. The stage unit according to claim 6, wherein the reaction mechanism comprises
   reaction canceling magnetic pole units that generate magnetic fluxes crossing the current paths of armature coils arranged on the four corners of the armature unit; and
   a control system that controls the directions and amplitudes of currents supplied to the armature coils arranged on the four corners of the armature unit.

8. The stage unit according to claim 7, wherein the reaction canceling magnetic pole units and the stator are mechanically independent of each other.

9. The stage unit according to claim 7, wherein the reaction canceling magnetic pole units generate forces perpendicular to one another on the neighboring corners of the armature unit.

10. An exposure apparatus that transfers a predetermined pattern onto a wafer by irradiating an energy beam and exposing the wafer, comprising:
    a stage unit according to claim 1 as the position controller to control the position of the wafer.

11. The making method of a stage unit having a movable stage comprising the steps of:
    providing a driver including a mover and a stator to drive the movable stage; and
    providing the reaction canceling mechanism that applies a force to cancel the reaction acting on the stator due to driving of the mover to the stator by an electromagnetic interaction, at least a part of the reaction canceling mechanisms being disposed above the stator.

12. A stage unit comprising:
    an armature unit that includes a plurality of armature coils, which are arranged in the shape of a matrix and have current paths almost parallel to the predetermined plane;
    a magnetic pole unit that has a plurality of magnets magnetized in directions not perpendicular to the predetermined plane and two-dimensionally generates an alternating magnetic field with a period of 4P/3 in two axis-directions perpendicular to each other, between the armature coils and itself, practically without generating any magnetic field in an area opposite to the armature unit P of the 4P/3 being a coil module width; and
    a current driver that moves the magnetic pole unit relatively to the armature unit in a plane parallel to the predetermined plane by supplying currents to the respective armature coils.

13. The stage unit according to claim 12 further comprising:
    a magnetic member supporting the armature coil in a side opposite with the magnetic pole unit.

14. The stage unit according to claim 12 further comprising:
    a flat-plate-like shaped member that is placed between the armature unit and the magnetic pole unit and made of a non-magnetic material.

15. The stage unit according to claim 12, wherein the current driver supplies currents to the respective armature coils independently.

16. The stage unit according to claim 12 further comprising:
    a position detection system that detects the positional relation between the magnetic and the armature unit; and
    a controller that controls at least one of the value and direction of currents supplied to the respective armature coils via the current driver according to the detection results of the position detection system.

17. The stage unit according to claim 16, wherein the control selectively supplies currents only to the armature coils opposite with the magnetic pole unit.

18. An exposure apparatus that transfers a predetermined pattern onto a wafer by irradiating an energy beam and exposing the wafer, comprising:
    a stage unit according to claim 12 as the position controller to control the position of the wafer.

19. The making method of a stage unit comprising the steps of:
    providing an armature unit that includes a plurality of armature coils, which are arranged in the shape of a matrix and have current paths almost parallel to the predetermined plane;
    providing a magnetic pole unit that has a plurality of magnets magnetized in directions not perpendicular to the predetermined plane and two-dimensionally generates an alternating magnetic field with a period of 4P/3 in two axis-directions perpendicular to each other, between the armature coils and itself, practically without generating any magnetic field in an area opposite to the armature unit, P of the 4P/3 being a coil module width; and providing a current driver that moves the magnetic pole unit relatively to the armature unit in a plane parallel to the predetermined plane by supplying currents to the respective armature coils.

20. The making method of a stage unit according to claim 19 further comprising the steps of:

providing a position detection system that detects the positional relation between the magnetic and the armature unit; and providing a controller that controls at least one of the value and direction of currents supplied to the respective armature coils via the current driver according to the detection results of the position detection system.

21. The making method of an exposure apparatus that transfers a predetermined pattern onto a wafer by irradiating an energy beam and exposing the wafer, comprising the steps of:

making a stage unit by providing an armature unit including a plurality of armature coils that are arranged in the shape of a matrix and have current paths almost parallel to the predetermined plane; a magnetic pole unit that has a plurality of magnets magnetized in directions not perpendicular to the predetermined plane and two-dimensionally generates an alternating magnetic field with a period of 4P/3 in two axis-directions perpendicular to each other, between the armature coils and itself, practically without generating any magnetic field in an area opposite to the armature unit; and a current driver that moves the magnetic pole unit relatively to the armature unit in a plane parallel to the predetermined plane, P of the 4P/3 being a coil module width; and placing the stage unit as the position controller that controls the position of the wafer.

22. An exposure apparatus that transfers a pattern onto a first wafer by irradiating an energy beam and exposing the first wafer, comprising:

a first wafer stage that holds the first wafer;

a driver having a stator and a mover coupled to the first wafer stage to drive the first wafer stage; and a reaction canceling system that applies to the stator an electromagnetic force to cancel a reaction force acting on the stator due to driving of the mover, at least a part of the reaction canceling system being disposed above the stator.

23. The exposure apparatus according to claim 22, wherein the driver is a planar motor.

24. The exposure apparatus according to claim 22, further comprising:

a second wafer stage that holds a second wafer.

25. The exposure apparatus according to claim 22, wherein the mover comprises a magnet member.

26. The exposure apparatus according to claim 22, wherein the mover comprises a magnet member without a yoke member.

27. An exposure apparatus that transfers a pattern onto a first wafer by irradiating an energy beam and exposing the first wafer, comprising:

a first wafer stage that holds the first wafer;

a driver having a stator and a mover coupled to the first wafer stage to drive the first wafer stage; and a reaction canceling system that applies to the stator an electromagnetic force to cancel a reaction force acting on the stator due to driving of the mover, the reaction canceling system cooperating with the stator to generate the electromagnetic force.

28. The exposure apparatus according to claim 27, wherein the driver is a planar motor.

29. The exposure apparatus according to claim 27, further comprising a second wafer stage that holds a second wafer.

30. The exposure apparatus according to claim 27, wherein the mover comprises a magnet member.

31. The exposure apparatus according to claim 27, wherein the mover comprises a magnet member without a yoke member.

* * * * *